United States Patent
Ito

(10) Patent No.: US 10,511,089 B2
(45) Date of Patent: Dec. 17, 2019

(54) ANTENNA DEVICE AND ELECTRONIC APPARATUS

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/972,263

(22) Filed: May 7, 2018

(65) Prior Publication Data

US 2018/0254552 A1 Sep. 6, 2018

Related U.S. Application Data

(63) Continuation of application No. PCT/JP2016/080161, filed on Oct. 12, 2016.

(30) Foreign Application Priority Data

Dec. 3, 2015 (JP) ................................. 2015-236356

(51) Int. Cl.
  *H01Q 1/52* (2006.01)
  *H01Q 7/06* (2006.01)
  (Continued)

(52) U.S. Cl.
  CPC ....... *H01Q 1/521* (2013.01); *G06K 19/07779* (2013.01); *H01Q 7/00* (2013.01);
  (Continued)

(58) Field of Classification Search
  CPC .. H01Q 7/06; H01Q 7/00; H01Q 7/08; H01Q 1/24; H01Q 1/521; H01Q 25/00
  See application file for complete search history.

(56) References Cited

U.S. PATENT DOCUMENTS

| 6,163,305 A * | 12/2000 | Murakami | H01Q 7/08 343/788 |
| 2014/0176384 A1* | 6/2014 | Yosui | H01Q 7/06 343/788 |

(Continued)

FOREIGN PATENT DOCUMENTS

| GB | 2469209 A | 10/2010 |
| JP | 2004-213582 A | 7/2004 |

(Continued)

OTHER PUBLICATIONS

Official Communication issued in International Patent Application No. PCT/JP2016/080161, dated Dec. 20, 2016.

*Primary Examiner* — Hoang V Nguyen
(74) *Attorney, Agent, or Firm* — Keating & Bennett, LLP

(57) ABSTRACT

An antenna device includes a first system coil antenna including a first coil conductor wound around a first winding axis, a first coil opening surrounded by the first coil conductor, and a first magnetic body; and a second system coil antenna including a second coil conductor wound around a second winding axis extending in a direction different from a direction in which the first winding axis extends, and a second coil opening surrounded by the second coil conductor. The second coil conductor is in a formation region of the first coil conductor and the first coil opening in the second winding axis direction when viewed from the first winding axis direction.

20 Claims, 15 Drawing Sheets

(51) Int. Cl.

| | | |
|---|---|---|
| *H01Q 7/00* | (2006.01) | |
| *H02J 50/20* | (2016.01) | |
| *H02J 50/12* | (2016.01) | |
| *H02J 7/02* | (2016.01) | |
| *H04B 5/00* | (2006.01) | |
| *G06K 19/077* | (2006.01) | |
| *H02J 50/70* | (2016.01) | |
| *H01Q 1/24* | (2006.01) | |
| *H01Q 25/00* | (2006.01) | |

(52) U.S. Cl.
CPC ............... *H01Q 7/06* (2013.01); *H02J 7/025* (2013.01); *H02J 50/12* (2016.02); *H02J 50/20* (2016.02); *H02J 50/70* (2016.02); *H04B 5/0031* (2013.01); *H04B 5/0037* (2013.01); *H04B 5/0075* (2013.01); *H04B 5/0081* (2013.01); *H01Q 1/24* (2013.01); *H01Q 25/00* (2013.01)

(56) References Cited

U.S. PATENT DOCUMENTS

2014/0253404 A1\* 9/2014 Ikemoto ................... H01Q 1/40
  343/788
2014/0375262 A1  12/2014  Yamaguchi et al.

FOREIGN PATENT DOCUMENTS

| JP | 2010-245776 A | 10/2010 |
|---|---|---|
| JP | 2013-120837 A | 6/2013 |
| JP | 2013-169122 A | 8/2013 |
| JP | 2014-049479 A | 3/2014 |
| WO | 2015/166835 A1 | 11/2015 |

\* cited by examiner

ANTENNA DEVICE AND ELECTRONIC APPARATUS

CROSS REFERENCE TO RELATED APPLICATIONS

This application claims the benefit of priority to Japanese Patent Application No. 2015-236356 filed on Dec. 3, 2015 and is a Continuation Application of PCT Application No. PCT/JP2016/080161 filed on Oct. 12, 2016. The entire contents of each application are hereby incorporated herein by reference.

BACKGROUND OF THE INVENTION

1. Field of the Invention

The present invention relates to an antenna device including coil antennas used in a plurality of systems and an electronic apparatus including the antenna device.

2. Description of the Related Art

A device in which a non-contact charging coil, an NFC antenna, and a magnetic sheet are provided in a single module is disclosed in each of Japanese Unexamined Patent Application Publication No. 2013-120837 and Japanese Unexamined Patent Application Publication No. 2013-169122.

In Japanese Unexamined Patent Application Publication No. 2013-120837 and Japanese Unexamined Patent Application Publication No. 2013-169122, a coil for non-contact charging and a coil for the NFC antenna are both formed in a planar shape and disposed on the same surface, thus providing a compact module.

In the case in which a coil for non-contact charging and a coil for an NFC antenna are defined as a module, how to alleviate interference (unwanted coupling) of both of the coils with each other causes a technical issue.

In the antenna device disclosed in Japanese Unexamined Patent Application Publication No. 2013-120837, strong unwanted coupling occurs because the coil for non-contact charging and the coil for the NFC antenna are coupled at four sides of the planar coils. Although the unwanted coupling is weakened by making the coil for the NFC antenna smaller than the coil for non-contact charging, NFC performance is degraded. In addition, the directivity of the coil for non-contact charging and the directivity of the coil for the NFC antenna are substantially the same. As such, in the case in which a coil of a communications partner of one of the above coils comes close, the coil of the communications partner is strongly coupled to both of the coils for non-contact charging and for the NFC antenna, and thus the coil of the communications partner is also largely influenced.

In the antenna device disclosed in Japanese Unexamined Patent Application Publication No. 2013-169122, a winding axis direction of the coil for non-contact charging differs from a winding axis direction of the coil for the NFC antenna. Accordingly, the coil for non-contact charging and the coil for the NFC antenna only slightly interfere with each other. However, interference occurs because one of the coils is disposed to establish interlinkage with a magnetic path of the other of the coils.

SUMMARY OF THE INVENTION

Preferred embodiments of the present invention provide antenna devices in which unwanted coupling between coil antennas used in a plurality of systems is reduced or prevented, and electronic apparatuses including the antenna devices.

An antenna device according to a preferred embodiment of the present invention includes a first system coil antenna including a first coil conductor wound around a first winding axis and a first coil opening surrounded by the first coil conductor; and a second system coil antenna including a second coil conductor wound around a second winding axis extending in a direction different from a direction of the first winding axis, and a second coil opening surrounded by the second coil conductor, wherein, when viewed from the first winding axis direction, the second coil conductor is positioned within a formation region of the first coil conductor and the first coil opening in the second winding axis direction.

With the above configuration, coupling (unwanted coupling) between the first system coil antenna and the second system coil antenna is small in strength because the direction of the coil winding axis of the first system coil antenna is different from the direction of the coil winding axis of the second system coil antenna.

It is preferable that, when viewed from the first winding axis direction, the entire or substantially entire second coil conductor is positioned within the formation region of the first coil conductor and the first coil opening. With this configuration, when viewed from the first winding axis direction (in a plan view), the entire occupation area of the second system coil antenna is included in an occupation area of the first system coil antenna so as to be reduced in size or miniaturized as a whole.

It is preferable that the second coil conductor is positioned inside the first coil opening when viewed from the first winding axis direction. With this configuration, a thickness of the second system coil antenna is able to be set within a value equal or substantially equal to a thickness of the first system coil antenna, thus reducing the overall thickness of the antenna device.

It is preferable that the second coil conductor includes a first conductor section and a second conductor section on opposed sides of the second winding axis, the first conductor section being closer to the first coil conductor than the second conductor section in the first winding axis direction when viewed from a direction perpendicular or substantially perpendicular to the first winding axis direction, and the first conductor section being positioned farther from the first coil conductor than the second conductor section when viewed from the first winding axis direction. With this configuration, both of the coupling between a region of the first coil conductor perpendicular or substantially perpendicular to the second system coil antenna winding axis direction (a side of the first coil conductor in a case of the first coil conductor having a rectangular or substantially rectangular shape or other suitable shape) and the first conductor section of the second coil conductor, and the coupling between a region of the first coil conductor perpendicular or substantially perpendicular to the second system coil antenna winding axis direction (a side of the first coil conductor in the case of the first coil conductor having a rectangular or substantially rectangular shape, or other suitable shape) and the second conductor section of the second coil conductor are reduced, such that the overall coupling between the first system coil antenna and the second system coil antenna is effectively reduced or prevented.

It is preferable that a line width of the first conductor section is larger than a line width of the second conductor section. This reduces DC resistance (DCR) of the second system coil antenna. In addition, in a case in which a sheet-shaped conductor is provided on the second conductor section side, parasitic capacitance generated between the second system coil antenna and the sheet-shaped conductor is reduced or prevented.

It is preferable that an antenna device according to a preferred embodiment of the present invention further includes a first magnetic body that overlaps with the first coil conductor in a view from the first winding axis direction, and is positioned on the second conductor section side in the first winding axis direction in a view from the direction perpendicular or substantially perpendicular to the first winding axis direction. This improves the degree of coupling between the first system coil antenna and a partner device antenna due to a magnetism collection effect of the first magnetic body.

It is preferable that an antenna device according to a preferred embodiment of the present invention further includes a second magnetic body that overlaps with the first conductor section and the second conductor section in a view from the first winding axis direction, and is positioned between the first conductor section and the second conductor section in a view from the direction perpendicular or substantially perpendicular to the first winding axis direction. This improves the degree of coupling between the second system coil antenna and a partner device antenna due to a magnetism collection effect of the second magnetic body.

An antenna device according to a preferred embodiment of the present invention may preferably further include a first magnetic body that overlaps with the first coil conductor in a view from the first winding axis direction and is positioned on the second conductor section side in the first winding axis direction in a view from the direction perpendicular or substantially perpendicular to the first winding axis direction, and a second magnetic body that overlaps with the first conductor section and the second conductor section in a view from the first winding axis direction and is positioned between the first conductor section and the second conductor section in a view from the direction perpendicular or substantially perpendicular to the first winding axis direction, wherein the first magnetic body and the second magnetic body may be isolated from each other. With this configuration, in the case in which a first system and a second system use different frequencies from each other, magnetic bodies suitable for the respective frequencies may be used.

An antenna device according to a preferred embodiment of the present invention may further include a first magnetic body that overlaps with the first coil conductor in a view from the first winding axis direction and is positioned on the second conductor section side in the first winding axis direction in a view from the direction perpendicular or substantially perpendicular to the first winding axis direction, and a second magnetic body that overlaps with the first conductor section and the second conductor section in a view from the first winding axis direction and is positioned between the first conductor section and the second conductor section in a view from the direction perpendicular or substantially perpendicular to the first winding axis direction, wherein the first magnetic body and the second magnetic body may be portions of a single magnetic body. This reduces the number of members so that the material cost and the assembly cost are reduced.

It is preferable that the first coil conductor and the second coil conductor are provided on a single insulation base material, and the insulation base material have a hole through which the second magnetic body passes.

It is preferable that an antenna device according to a preferred embodiment of the present invention further includes a first system coil that is connected to a first system circuit, and connects the first system circuit and the first system coil antenna by magnetic field coupling. With this configuration, the first system circuit is not directly connected to the first coil conductor, but is connected thereto with the first system coil interposed therebetween. As such, a signal, power, and the like for the second system are reduced or prevented being input to the first system circuit, by a filtering effect provided by the magnetic field coupling of the first system coil.

It is preferable that an antenna device according to a preferred embodiment of the present invention further includes a second system coil that is connected to a second system circuit, and connects the second system circuit and the second system coil antenna by magnetic field coupling. With this configuration, the second system circuit is not directly connected to the second coil conductor, but is connected thereto with the second system coil interposed therebetween. As such, a signal, power, and the like for the first system are reduced or prevented from being input to the second system circuit, by a filtering effect provided by the magnetic field coupling of the second system coil.

It is preferable that each of the first system and the second system is a system using a frequency band in the HF band or a frequency band lower than the HF band. With this configuration, electromagnetic wave radiation is unlikely to occur because of the frequency being low. Accordingly, electromagnetic wave radiation loss is unlikely to be generated, and information leakage, malfunction of an external device or other problems are unlikely to occur because the signals, power, and the like do not spread extensively. In addition, interference is unlikely to occur with an antenna of another frequency band such as the UHF band installed in an electronic apparatus, or other device.

It is preferable that one of the first system and the second system is a power transmission system and the other one thereof be a communication system. With this configuration, the antenna device is able to be used as a compact antenna device installed in an electronic apparatus including a power transmission system and a communication system, and a compact electronic apparatus including both the systems is able to be obtained.

It is preferable that the power transmission system is a magnetic-field resonance power transmission system. This makes it possible to transmit power with high power transmission efficiency.

It is preferable that the communication system is a near field communication (short range radio communication) system. This makes it possible to communicate with an antenna device of a communication partner in a face-to-face state.

An electronic apparatus according to a preferred embodiment of the present invention includes an antenna device, and a first system circuit and a second system circuit that are connected to the antenna device, wherein the antenna device includes a first system coil antenna including a first coil conductor wound around a first winding axis and a first coil opening surrounded by the first coil conductor; and a second system coil antenna including a second coil conductor wound around a second winding axis extending in a direction different from a direction of the first winding axis and a second coil opening surrounded by the second coil conductor, and when viewed from the first winding axis direction, the second coil conductor is positioned within a formation region of the first coil conductor and the first coil opening in the second winding axis direction.

With this configuration, a compact electronic apparatus to be used in a plurality of systems is provided, because the apparatus includes an antenna device in which, in spite of the device being small in size, unwanted coupling between the coil antennas used in the first system and the second system is small in strength.

According to preferred embodiments of the present invention, antenna devices in which unwanted coupling between coil antennas used in a plurality of systems is reduced or prevented, and electronic apparatuses including the antenna devices are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
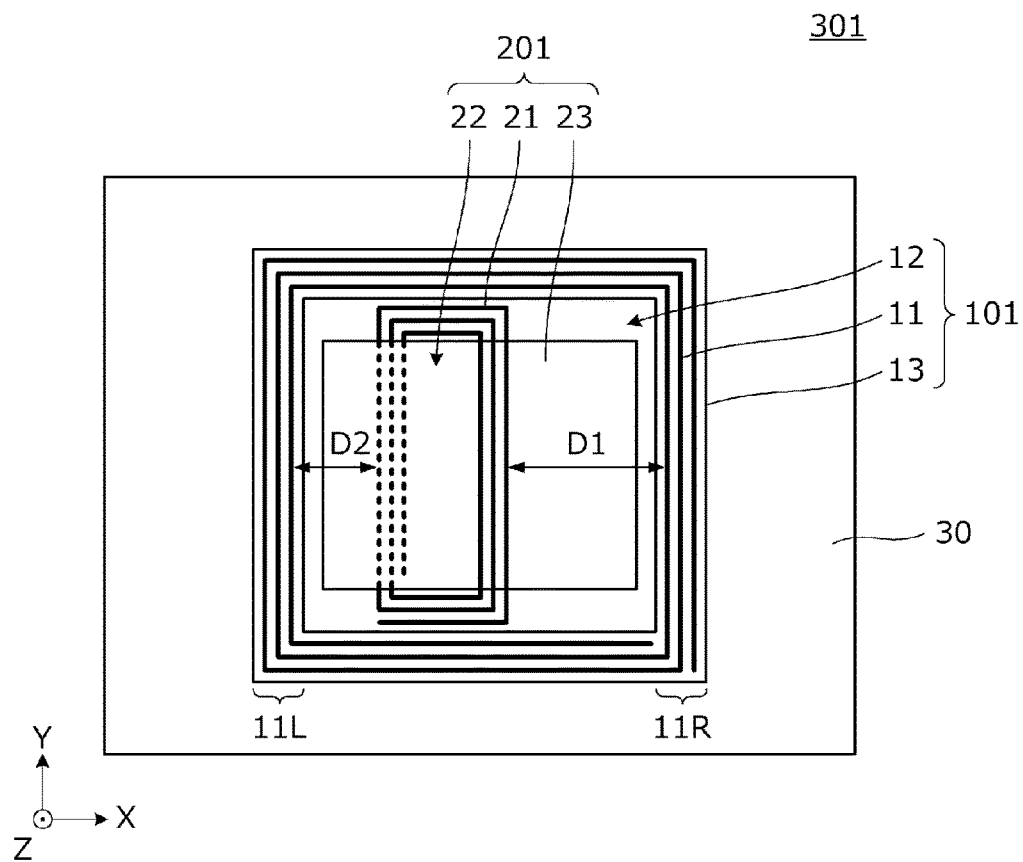
FIG. 1A is a plan view of a main portion of an antenna device 301 according to a first preferred embodiment of the present invention.

Hereinafter, a plurality of preferred embodiments of the present invention will be described with reference to the drawings. The same elements are given identical reference signs in the drawings. In order to explain important points of or facilitate the understanding of the preferred embodiments, the following description will be provided on a preferred embodiment-by-preferred embodiment basis for the sake of convenience of explanation. Note that, however, configurations described in different preferred embodiments may partially be replaced or combined with each other. In a second and subsequent preferred embodiments, descriptions of the same elements as those of a first preferred embodiment will be omitted, and only different elements from those of the first preferred embodiment will be described. In particular, the same effects and advantages achieved by the same configuration will not be repeatedly described in each of the preferred embodiments.

First Preferred Embodiment

Figure 1B:
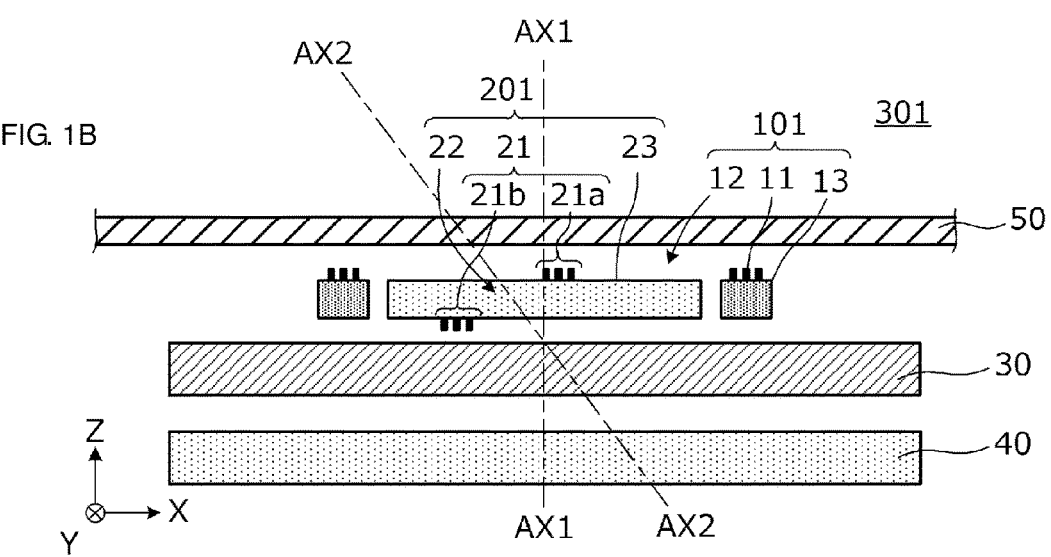
FIG. 1B is a longitudinal cross-sectional view passing through the center thereof.

FIG. 1A is a plan view of a main portion of an antenna device 301 according to a first preferred embodiment of the present invention, and FIG. 1B is a longitudinal cross-sectional view passing through the center or approximate center thereof. The antenna device 301 is mounted in an electronic apparatus, such as a smart phone, for example. The antenna device 301 is disposed between a circuit board 40 on which control components and other components of the electronic apparatus are mounted and a housing 50 of the electronic apparatus accommodating the antenna device 301, the circuit board 40, and other components.

The antenna device 301 includes a first system coil antenna 101 and a second system coil antenna 201. The first system coil antenna 101 includes a first coil conductor 11, a first coil opening 12 surrounded by the first coil conductor 11, and a first magnetic body 13. The second system coil antenna 201 includes a second coil conductor 21, a second coil opening 22 surrounded by the second coil conductor 21, and a second magnetic body 23. The first system coil antenna 101 is a power receiving antenna that is used in a magnetic-field non-contact power transmission system, such as, for example, an electromagnetic induction power transmission system and a magnetic-field resonance power transmission system. For example, the magnetic-field resonance power transmission system is preferably used at a frequency in the HF band, particularly, at a frequency near 6.78 MHz. The magnetic-field non-contact power transmission system performs power transmission with a power transmission partner through magnetic field coupling. The power transmission system is used to charge an electronic apparatus, such as a smart phone, for example. The second system coil antenna 201 is used in a communication system, such as a short range radio communication system. The short range radio communication system is, for example, a system using NFC (Near Field Communication), or other suitable systems. For example, the short range radio communication system is preferably used at a frequency in the HF band, particularly, at a frequency near 13.56 MHz. The short range radio communication system communicates with a communications partner through magnetic field coupling. Each of the first system coil antenna 101 and the second system coil antenna 201 is an antenna for a non-contact transmission system.

The electronic apparatus in which the antenna device 301 is mounted may preferably be, for example, a cellular phone such as a feature phone, PDA, a wearable terminal, such as smart glasses or a smart watch, a notebook PC, a tablet terminal, a camera, a game machine, a toy, or other suitable electronic component. The first system coil antenna 101 may be a power transmission antenna. The first system coil antenna 101 may be used in a communication system and the second system coil antenna 201 may be used in a power transmission system. The first system coil antenna 101 and the second system coil antenna 201 may be used in different communication systems from each other, or may be used in different power transmission systems from each other. Further, the first system coil antenna 101 and the second system coil antenna 201 may be used in systems other than a communication system and a power transmission system.

The first coil conductor 11 is preferably a rectangular or substantially rectangular spiral-shaped conductor with a plurality of turns including a first winding axis AX1 extending in a Z-axis direction. The second coil conductor 21 is a conductor with a plurality of turns including a second winding axis AX2 and having a rectangular or substantially rectangular spiral shape in a plan view from the first winding axis AX1 direction (Z-axis direction). The entire second coil conductor 21 is positioned within a formation region of the first coil opening 12 in the second winding axis AX2 direction when viewed from the first winding axis AX1 direction (Z-axis direction) (in other words, in a direction of an axis seen when the second winding axis AX2 is projected on an X-Y plane).

The second coil conductor 21 includes a first conductor section 21a and a second conductor section 21b on opposed sides of the second winding axis AX2.

With the above-described configuration, unwanted coupling between the first system coil antenna 101 and the second system coil antenna 201 is small in strength because the direction of the first winding axis AX1 of the first system coil antenna 101 is different from the direction of the second winding axis AX2 of the second system coil antenna 201.

In the present preferred embodiment, the first winding axis AX1 direction of the first coil conductor 11 is different from the second winding axis AX2 direction of the second coil conductor 21, and the second coil conductor 21 is positioned within the formation region of the first coil opening 12 in the second winding axis AX2 direction (that is, an X-axis direction) in a plan view from the first winding axis AX1 direction (Z-axis direction). With this configuration, magnetic field coupling between the first coil conductor 11 and the second coil conductor 21 is unlikely to occur. The reason for this may be explained as follows.

Figure 2A:
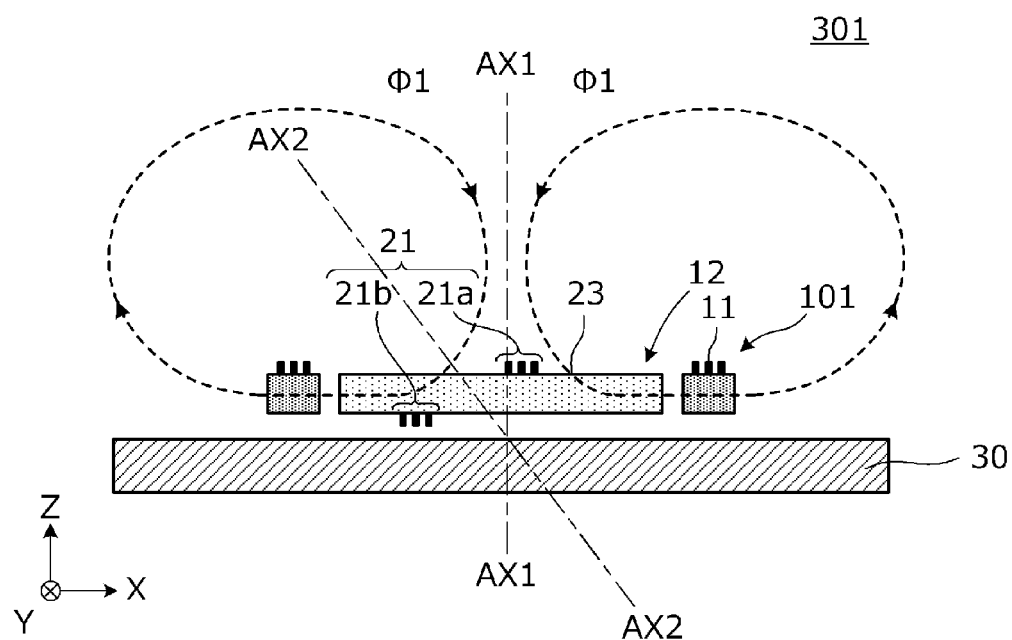
FIG. 2A is a diagram illustrating magnetic flux produced by a first system coil antenna 101 of the antenna device 301.

FIG. 2A is a diagram illustrating magnetic flux produced by the first system coil antenna 101 of the antenna device 301 according to the present preferred embodiment. As illustrated in FIG. 2A, magnetic flux $\Phi 1$ generated by a current flowing through the first coil conductor 11 is unlikely to establish interlinkage with the second coil conductor 21. This is because, although the magnetic flux $\Phi 1$ is generated substantially along the first winding axis AX1 inside a column region in which the first coil opening 12 is denoted as a bottom and the first winding axis AX1 direction (Z-axis direction) is denoted as a height direction, the magnetic flux $\Phi 1$ is unlikely to establish interlinkage with the second coil conductor 21 having the second winding axis AX2 direction, which is different from the first winding axis AX1 direction.

Figure 2B:
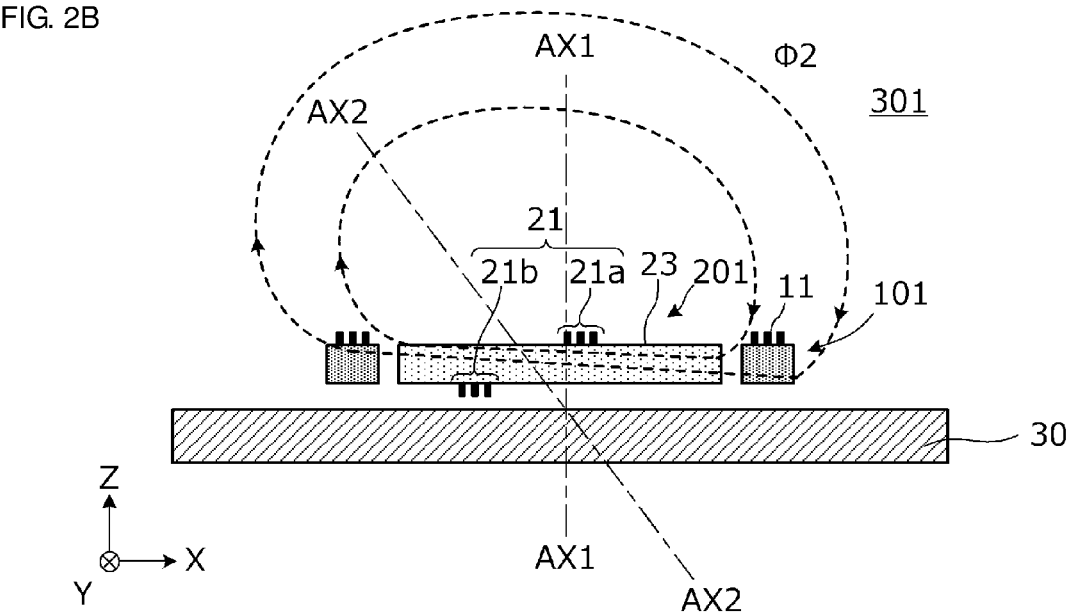
FIG. 2B is a diagram illustrating magnetic flux produced by a second system coil antenna 201 of the antenna device 301.

FIG. 2B is a diagram illustrating magnetic flux produced by the second system coil antenna 201 of the antenna device 301 according to the present preferred embodiment. As illustrated in FIG. 2B, magnetic flux $\Phi 2$ generated by a current flowing through the second coil conductor 21 is unlikely to establish interlinkage with the first coil conductor 11. This is because, in the case of the positional relationship between the first coil conductor 11 and the second coil conductor 21, the magnetic flux $\Phi 2$ produced by the second coil conductor 21 enters into and exits from the coil opening of the first coil conductor 11, or rotates around in an outer side portion of the first coil conductor 11, thus making it difficult to establish the interlinkage with the first coil conductor 11.

As discussed above, magnetic field coupling is unlikely to occur at least in a case in which, when viewed from the winding axis direction of one of the coil conductors, the other of the coil conductors is positioned within a formation region of the one of the coil conductors in the winding axis direction of the other of the coils. When viewed from the winding axis direction of one of the coil conductors, the other of the coil conductors may be positioned within a formation region of the one of the coil conductors in the winding axis direction of the other of the coils, and in addition, when viewed from the winding axis direction of the other of the coil conductors, the one of the coil conductors may be positioned within a formation region of the other of the coil conductors in the winding axis direction of the one of the coils.

Further, in the present preferred embodiment, when viewed from a direction perpendicular or substantially perpendicular to the first winding axis AX1 direction and from a direction perpendicular or substantially perpendicular to the second winding axis AX2 direction (a Y-axis direction), the first conductor section 21a is closer to the first coil conductor 11 than the second conductor section 21b in the first winding axis AX1 direction. Further, in a plan view from the first winding axis AX1 direction, the first conductor section 21a is positioned farther from the first coil conductor 11 than the second conductor section 21b in the second winding axis AX2 direction. That is, D1 is greater than D2 in FIG. 1A. With this configuration, a region of the first coil conductor 11 perpendicular or substantially perpendicular to the second winding axis AX2 direction in a plan view from the first winding axis AX1 direction (a right side 11R of the first coil conductor 11) and the first conductor section 21a of the second coil conductor 21 are distanced from each other in the second winding axis AX2 direction in a plan view from the first winding axis AX1 direction, such that electric field coupling, magnetic field coupling, and other coupling are small in strength. Further, a region of the first coil conductor 11 perpendicular or substantially perpendicular to the second winding axis AX2 direction in a plan view from the first winding axis AX1 direction (a left side 11L of the first coil conductor 11) and the second conductor section 21b of the second coil conductor 21 are distanced from each other in the first winding axis AX1 direction (Z-axis direction), such that the electric field coupling, magnetic field coupling, and other coupling are small in strength therebetween. Due to this, the overall coupling between the first system coil antenna 101 and the second system coil antenna 201 is effectively reduced or prevented by the above-described configuration.

Furthermore, the present preferred embodiment includes the second magnetic body 23 overlapping with the first conductor section 21a and the second conductor section 21b in a view from the first winding axis AX1 direction, and positioned between the first conductor section 21a and the second conductor section 21b in a view from a direction perpendicular or substantially perpendicular to the first winding axis AX1 direction (e.g., from the Y-axis direction). The second magnetic body 23 is preferably, for example, a magnetic ferrite plate having a rectangular or substantially rectangular parallelepiped shape including a principal surface perpendicular or substantially perpendicular to the first winding axis AX1. Magnetic flux that is generated by the second coil conductor 21 and passes through the coil opening of the second coil conductor 21, passes through the second magnetic body 23 in a surface direction thereof. Accordingly, the second winding axis AX2 is preferably slanted so as to be closer to a state of being parallel or substantially parallel to the surface of the second magnetic body 23. Due to this, unwanted magnetic field coupling between the first system coil antenna 101 and the second system coil antenna 201 is small in strength.

Moreover, by the second magnetic body 23 being provided, the degree of coupling between the second system coil antenna and a partner device antenna is large due to the magnetism collection effect of the second magnetic body 23.

The first system coil antenna 101 includes the first magnetic body 13, which overlaps with the first coil conductor 11 in a view from the first winding axis AX1 direction. The first magnetic body 13 is preferably, for example, a magnetic ferrite plate having a rectangular or substantially rectangular frame shape including an opening. The first magnetic body 13 is positioned, when viewed from a direction perpendicular or substantially perpendicular to the first winding axis AX1 direction (e.g., from the Y-axis direction), on the second conductor section 21b side in the first winding axis AX1 direction (that is, at a position in the Z-axis direction). Magnetic flux that is generated by the first coil conductor 11 and passes through the coil opening of the first coil conductor 11, passes through the opening of the first magnetic body 13 or passes through the first magnetic body 13 in a surface direction as well as in an internal and external direction thereof. As described above, the degree of coupling between the first system coil antenna 101 and the partner device antenna is large due to the magnetism collection effect of the first magnetic body 13.

The first magnetic body 13 and the second magnetic body 23 are preferably disposed on the same surface in the present preferred embodiment. A sheet-shaped conductor 30 is provided, in parallel or substantially in parallel to the surface, on the second conductor section 21b side of the second coil conductor 21. The sheet-shaped conductor 30 is positioned on the opposite side to the housing 50 of the electronic apparatus (see FIGS. 1A and 1B) in the antenna device 301. The sheet-shaped conductor 30 may be not only a conductive material exclusively prepared for the antenna device 301, but also a conductive functional material that is shared with the antenna device 301, such as a circuit board included in the electronic apparatus, a shield of a display panel or other apparatus, or a battery pack, for example. The sheet-shaped conductor 30 changes a magnetic path and improves the coupling with the partner device antenna at the time of the second system coil antenna 201 being used.

Figure 3A:
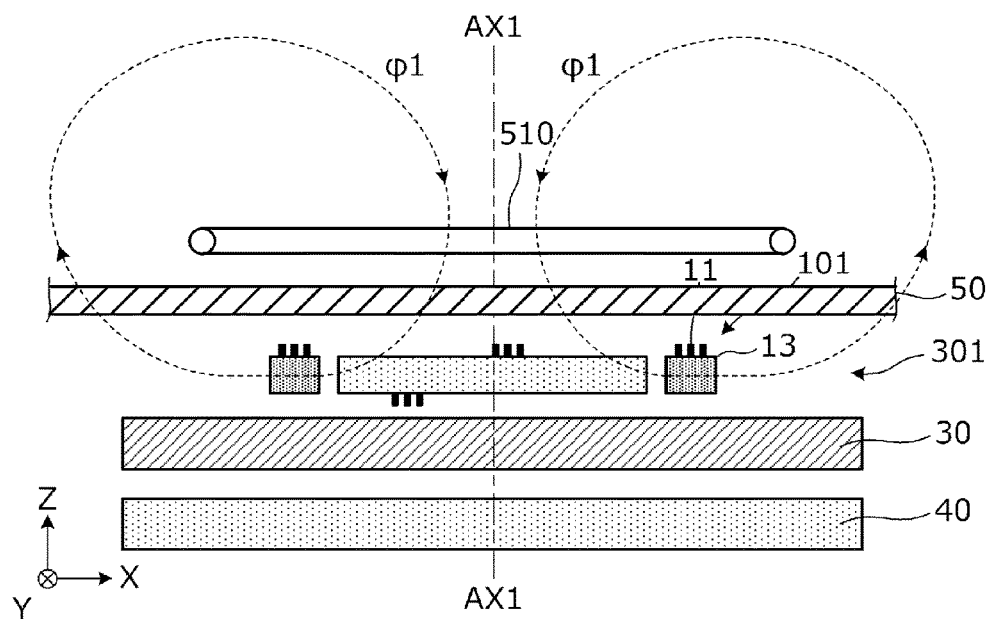
FIG. 3A is a diagram illustrating a coupling state of a first system with a partner-side coil antenna.
Figure 3B:
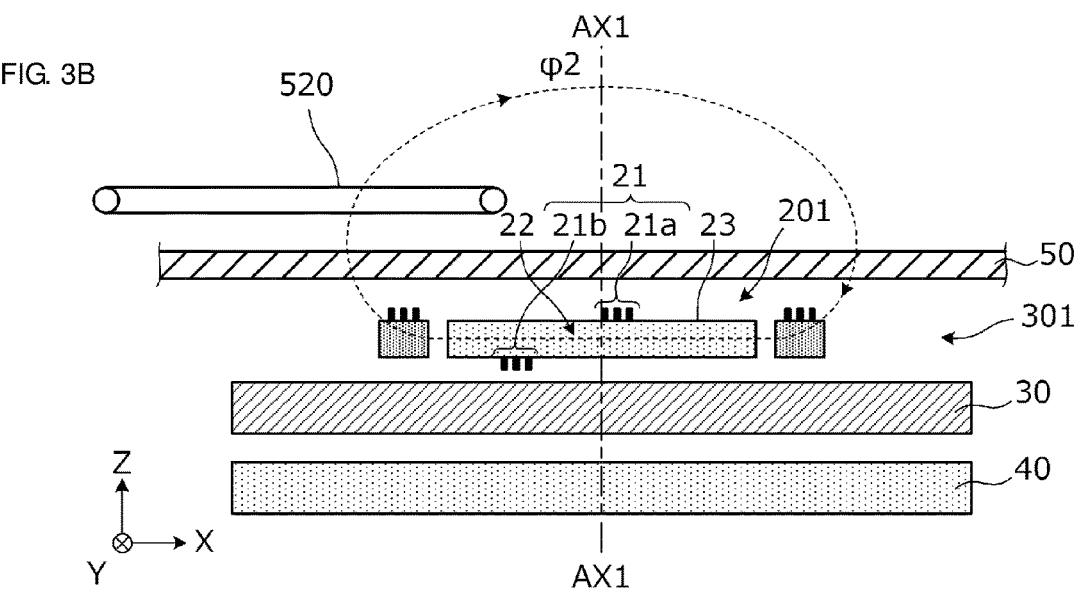
FIG. 3B is a diagram illustrating a coupling state of a second system with a partner-side coil antenna.

FIG. 3A is a diagram illustrating a coupling state of the first system with a partner-side coil antenna, and FIG. 3B is a diagram illustrating a coupling state of the second system with a partner-side coil antenna.

As illustrated in FIG. 3A, a partner-side first system coil antenna 510 is disposed on a side of the first coil conductor 11 of the first system coil antenna 101 farther from the sheet-shaped conductor 30. As illustrated in FIG. 3A, magnetic flux $\varphi 1$ generated by the partner-side first system coil antenna 510 establishes interlinkage with the first coil conductor 11 of the first system coil antenna 101. Accordingly, the first system coil antenna 101 and the partner-side first system coil antenna 510 are magnetically coupled.

Even if the magnetic body 13 and the sheet-shaped conductor 30 are not present, the first system coil antenna 101 and the partner-side first system coil antenna 510 are magnetically coupled because the winding axis of the first system coil antenna 101 substantially matches the winding axis of the partner-side first system coil antenna 510.

As illustrated in FIG. 3B, a partner-side second system coil antenna 520 is disposed at a position such that magnetic flux $\varphi 2$ generated by the partner-side second system coil antenna 520 passes through the second coil opening 22 of the second system coil antenna 201. More specifically, the partner-side second system coil antenna 520 is disposed at a position shifted from the center of the second system coil antenna 201 towards the second conductor section 21b side of the second coil conductor 21 in a plan view from the first winding axis AX1 direction. Accordingly, the second system coil antenna 201 and the partner-side second system coil antenna 520 are magnetically coupled.

According to the present preferred embodiment, the magnetic bodies are isolated between the first system coil antenna and the second system coil antenna. As such, in the case in which the first system and the second system are required to have different magnetic-body characteristics from each other, magnetic bodies having suitable characteristics for the respective systems are able to be used. For example, magnetic bodies in which iron loss (core loss), anisotropy, or dispersiveness of magnetic permeability differs from each other are able to be used.

Figure 4:
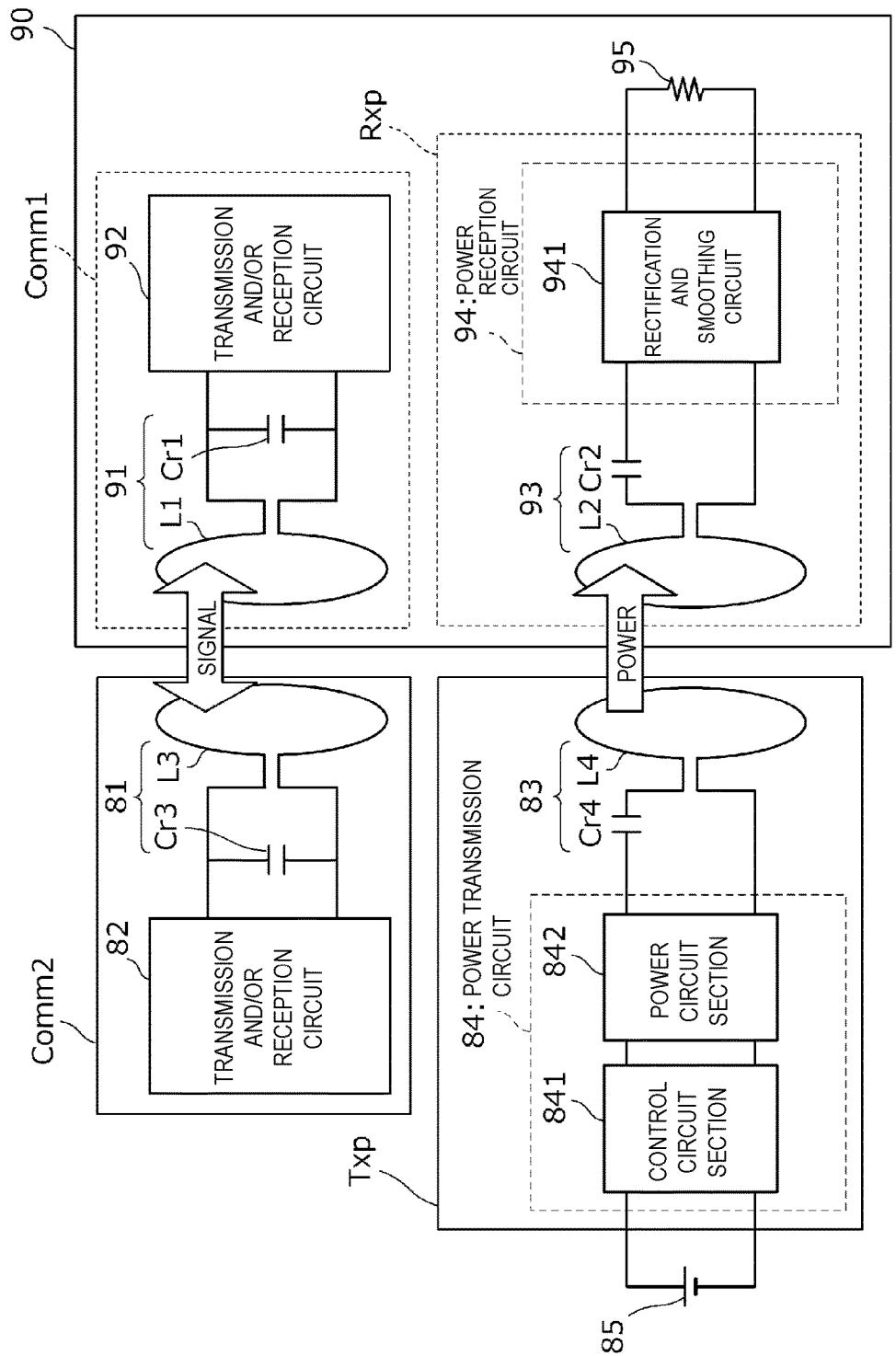
FIG. 4 is a diagram illustrating a configuration of an electronic apparatus including an antenna device, and configurations of a first system and a second system according to the present preferred embodiment of the present invention.

FIG. 4 is a diagram illustrating a configuration of an electronic apparatus including the antenna device, and configurations of the first and second systems according to the present preferred embodiment.

In FIG. 4, an electronic apparatus 90 includes a communication device Comm1 and a power reception device Rxp. The communication device Comm1 defines, along with a communication device Comm2, a short range radio communication system preferably using NFC, for example. The power reception device Rxp defines a magnetic-field resonance power transmission system along with a power transmission device Txp. The communication device Comm1 includes a communication coil L1, a capacitor Cr1 defining an LC resonance circuit 91 along with the communication coil L1, and a transmission and/or reception circuit 92 that is electrically connected to the LC resonance circuit 91 and is defined and functions to at least output a signal to or input a signal from the communication coil L1. The transmission and/or reception circuit 92 preferably handles a signal of 13.56 MHz or near 13.56 MHz in the HF band, for example.

Both ends of the communication coil L1, which electrically define and function as a coil, are connected to the transmission and/or reception circuit 92. The resonant frequency of the LC resonance circuit 91 is preferably set to 13.56 MHz or near 13.56 MHz in the HF band, for example.

The communication device Comm2 includes a communication coil L3, a capacitor Cr3 defining an LC resonance circuit 81 along with the communication coil L3, and a transmission and/or reception circuit 82 that is electrically connected to the LC resonance circuit 81 and is defined and functions to at least output a signal to or input a signal from the communication coil L3. The transmission and/or reception circuit 82 preferably handles a signal of 13.56 MHz or near 14.56 MHz in the HF band, for example. Both ends of the communication coil L3, which electrically define and function as a coil, are connected to the transmission and/or reception circuit 82. The resonant frequency of the LC resonance circuit 81 is preferably set to 13.56 MHz or near 13.56 MHz, for example.

The power reception device Rxp includes a power reception coil L2, a power reception resonance capacitor Cr2 defining a power reception resonance mechanism 93 along with the power reception coil L2, and a power reception circuit 94 that is electrically connected to the power reception resonance mechanism 93 and supplies power to a load. The power reception circuit 94 preferably handles power of 6.78 MHz or near 6.78 MHz in the HF band as the ISM band, for example. Both ends of the power reception coil L2, which electrically define and function as a coil, are connected to the power reception circuit 94. The power transmission device Txp includes a power transmission coil L4, a power transmission resonance capacitor Cr4 defining a power transmission resonance mechanism 83 along with the power transmission coil L4, and a power transmission circuit 84 that is electrically connected to the power transmission resonance mechanism 83, intermittently applies a DC input voltage to the power transmission resonance mechanism 83, and makes the transmission coil L4 generate an AC voltage. The power transmission circuit 84 preferably handles power of 6.78 MHz or near 6.78 MHz in the HF band as the ISM band, for example. Both ends of the power transmission coil L4, which electrically define and function as a coil, are connected to the power transmission circuit 84. An input power supply 85 is connected to the power transmission device Txp, a load 95 is connected to the power reception device Rxp, and the power is supplied from the power transmission device Txp to the power reception device Rxp. The power reception circuit 94 includes a rectifying and smoothing circuit 941. The power transmission circuit 84 includes a control circuit 841 that converts an input power supply voltage to an alternating voltage, and a power circuit 842 that converts the above alternating voltage to the power. The frequency of the magnetic-field resonance is preferably set to 6.78 MHz or near 6.78 MHz, for example.

The communication coil L1 corresponds to the second system coil antenna 201 illustrated in FIGS. 1A and 1B, and the power reception coil L2 corresponds to the first system coil antenna 101 illustrated in FIGS. 1A and 1B. As described above, in the case of an antenna device to be used in a communication system and a power transmission system, it is preferable for a coil conductor of a coil antenna for the power transmission to have a larger line width than a coil conductor of a coil antenna for the communication. This reduces loss due to DC resistance (DCR) of the coil antenna without causing the overall antenna device to be large.

Second Preferred Embodiment

In a second preferred embodiment of the present invention, an example in which a configuration of a second system coil antenna is different from that of the second system coil antenna of the first preferred embodiment will be described.

Figure 5A:
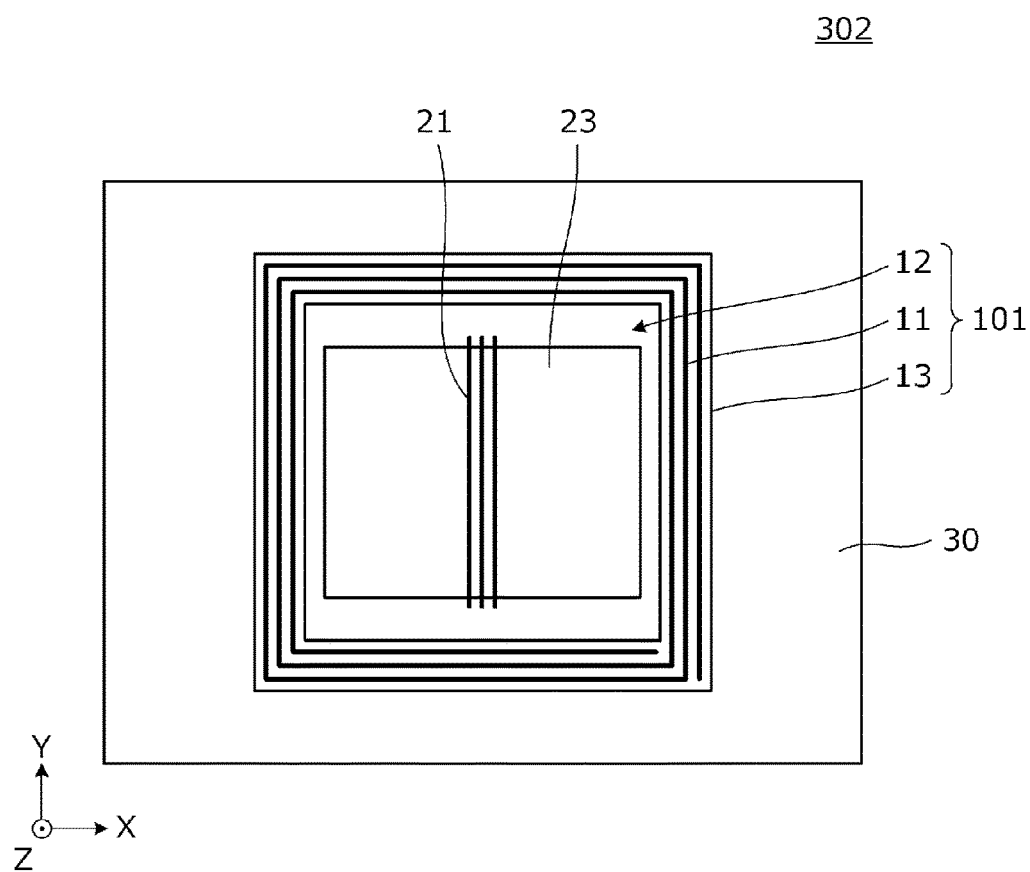
FIG. 5A is a plan view of a main portion of an antenna device 302 according to a second preferred embodiment of the present invention.
Figure 5B:
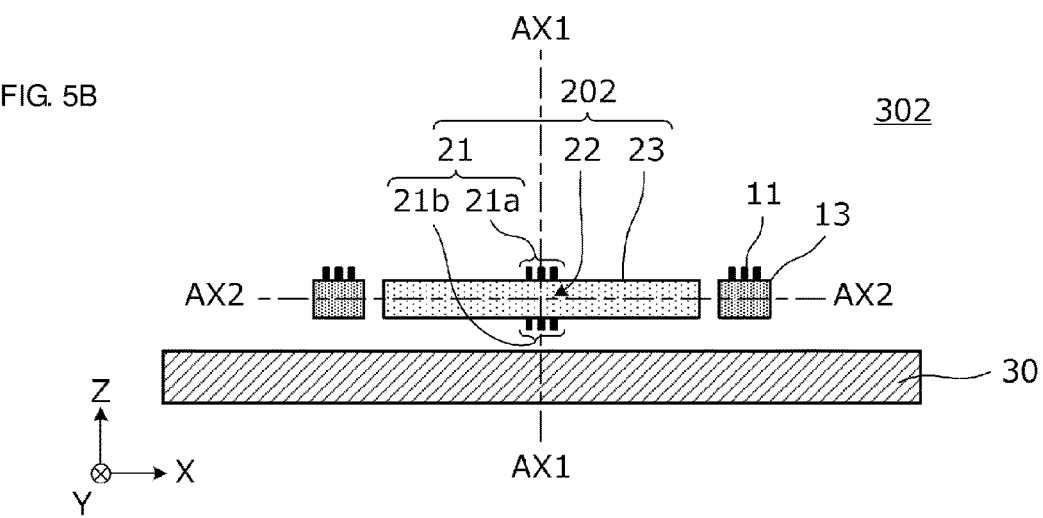
FIG. 5B is a longitudinal cross-sectional view passing through the center thereof.

FIG. 5A is a plan view of a main portion of an antenna device 302 according to the second preferred embodiment, and FIG. 5B is a longitudinal cross-sectional view passing through the center or approximate center thereof. The antenna device 302 includes a first system coil antenna 101 and a second system coil antenna 202. The first system coil antenna 101 is preferably the same or substantially the same as that described in the first preferred embodiment, and includes the first coil conductor 11, the first coil opening 12 surrounded by the first coil conductor 11, and the first magnetic body 13. The second system coil antenna 202 includes a second coil conductor 21, a second coil opening 22 surrounded by the second coil conductor 21, and a second magnetic body 23.

The second coil conductor 21 is preferably a rectangular or substantially rectangular helically-shaped conductor including a plurality of turns when viewed from a second winding axis AX2 direction (X-axis direction). The entire second coil conductor 21 is positioned within the formation region of the first coil opening 12 in the second winding axis AX2 direction (X-axis direction) when viewed from a first winding axis AX1 direction (Z-axis direction).

The second coil conductor 21 includes a first conductor section 21a and a second conductor section 21b on opposed sides of the second winding axis AX2.

With the above-described configuration, unwanted coupling between the first system coil antenna 101 and the second system coil antenna 202 is small in strength because the first winding axis AX1 of the first system coil antenna 101 is orthogonal or substantially orthogonal to the second winding axis AX2 of the second system coil antenna 202.

Third Preferred Embodiment

In a third preferred embodiment of the present invention, an example in which a configuration of a second system coil antenna is different from that of the second system coil antenna of the first preferred embodiment will be described.

Figure 6A:
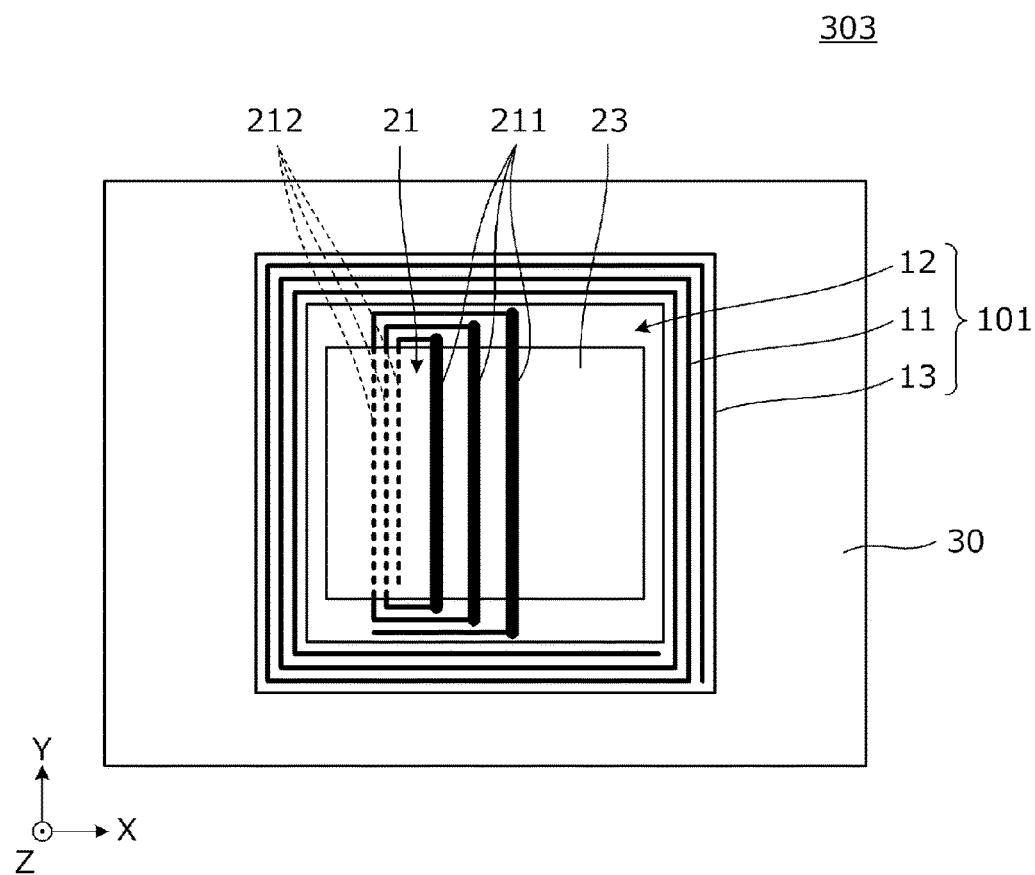
FIG. 6A is a plan view of a main portion of an antenna device 303 according to a third preferred embodiment of the present invention.
Figure 6B:
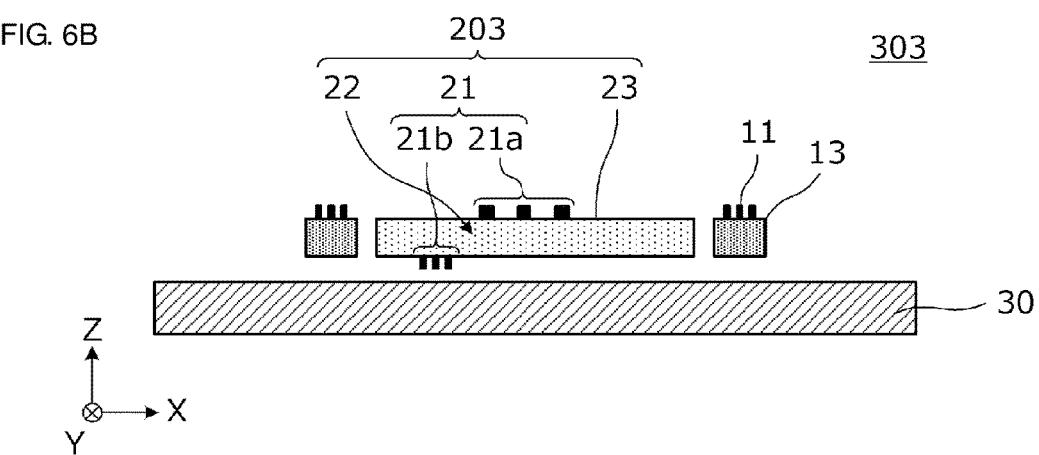
FIG. 6B is a longitudinal cross-sectional view passing through the center thereof.

FIG. 6A is a plan view of a main portion of an antenna device 303 according to the third preferred embodiment, and FIG. 6B is a longitudinal cross-sectional view passing through the center or approximate center thereof. The antenna device 303 includes a first system coil antenna 101 and a second system coil antenna 203. The first system coil antenna 101 is preferably the same or substantially the same as that described in the first preferred embodiment, and includes the first coil conductor 11, the first coil opening 12 surrounded by the first coil conductor 11, and the first magnetic body 13. The second system coil antenna 203 includes a second coil conductor 21, a second coil opening 22 surrounded by the second coil conductor 21, and a second magnetic body 23.

The second system coil antenna 201 is different from the first preferred embodiment illustrated in FIGS. 1A and 1B in that the line width of a first conductor section 21a is larger (thicker) than that of a second conductor section 21b.

According to the present preferred embodiment, DC resistance (DCR) of the second system coil antenna 203 is smaller than that of the second system coil antenna 201 of the first preferred embodiment. Further, because the line width of the second conductor section 21b close to a sheet-shaped conductor 30 is thinner than that of the first conductor section 21a far from the sheet-shaped conductor 30, parasitic capacitance generated between the second coil conductor 21 and the sheet-shaped conductor 30 is not increased.

Fourth Preferred Embodiment

In a fourth preferred embodiment of the present invention, an example in which a configuration of a first system coil antenna is different from that of the first system coil antenna of the first preferred embodiment will be described.

Figure 7A:
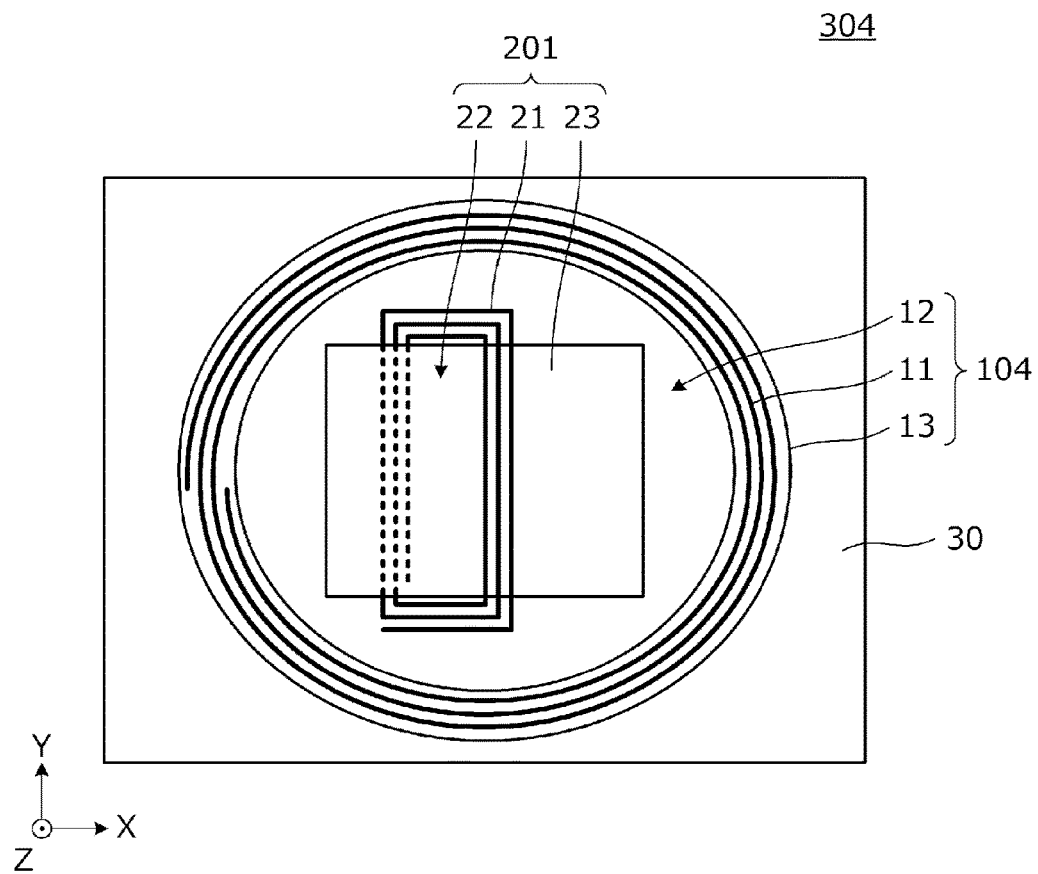
FIG. 7A is a plan view of a main portion of an antenna device 304 according to a fourth preferred embodiment of the present invention.
Figure 7B:
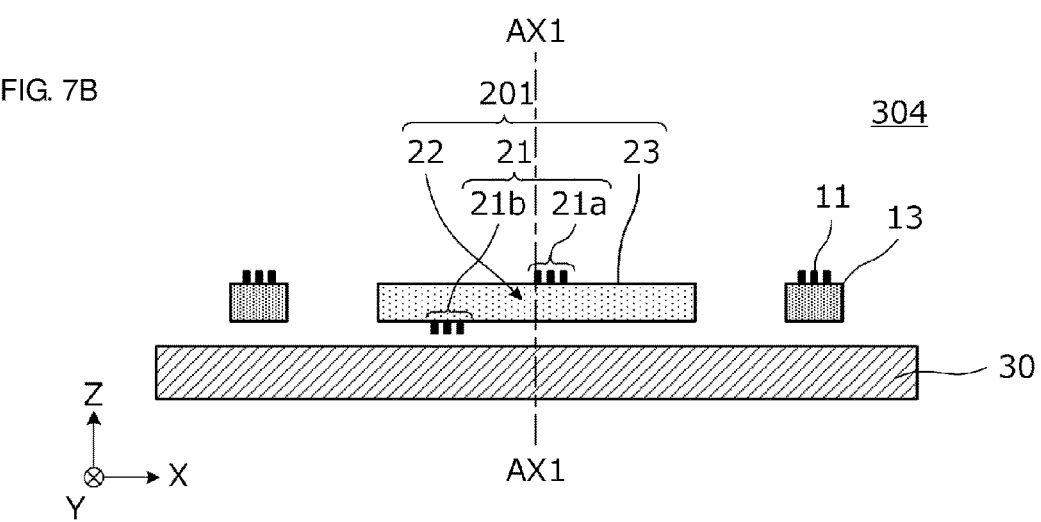
FIG. 7B is a longitudinal cross-sectional view passing through the center thereof.

FIG. 7A is a plan view of a main portion of an antenna device 304 according to the fourth preferred embodiment, and FIG. 7B is a longitudinal cross-sectional view passing through the center or approximate center thereof. The antenna device 304 includes a first system coil antenna 104 and a second system coil antenna 201. The first system coil antenna 104 includes a first coil conductor 11, a first coil opening 12 surrounded by the first coil conductor 11, and a first magnetic body 13. The configuration of the second system coil antenna 201 is preferably the same or substantially the same as that described in the first preferred embodiment.

In the present preferred embodiment, the first coil conductor 11 is preferably an oval or substantially oval spiral-shaped conductor with a plurality of turns including a first winding axis AX1 extending in a Z-axis direction. The first magnetic body 13 overlapping with the first coil conductor 11 is preferably a magnetic ferrite plate having an oval ring shape when viewed from the first winding axis AX1 direction. Other elements are the same or substantially the same as those described in the first preferred embodiment.

It is not absolutely necessary for a plan shape of the first coil conductor 11 and the first magnetic body 13 to be rectangular or substantially rectangular, and the plan shape thereof may be oval, substantially oval or other suitable shapes, for example, as described in the present preferred embodiment. Similarly, it is not absolutely necessary for a plan shape of the second coil conductor 21 and the second magnetic body 23 to be rectangular or substantially rectangular, and the plan shape thereof may be oval, substantially oval or other suitable shapes, for example.

Fifth Preferred Embodiment

In a fifth preferred embodiment of the present invention, an example in which a configuration of a second system coil antenna is different from that of the second system coil antenna of the first preferred embodiment will be described.

Figure 8:
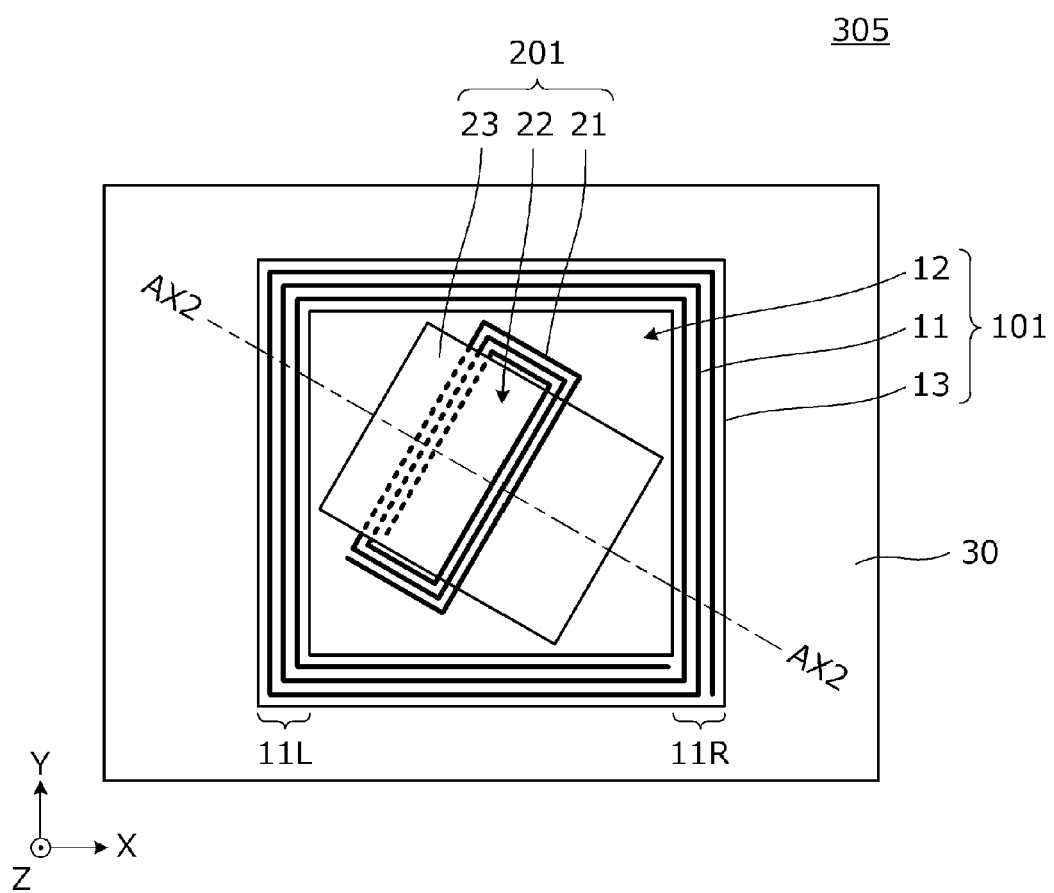
FIG. 8 is a plan view of an antenna device 305 according to a fifth preferred embodiment of the present invention.

FIG. 8 is a plan view of an antenna device 305 according to the fifth preferred embodiment. The second winding axis AX2 of the second system coil antenna 201 illustrated in FIGS. 1A and 1B in the first preferred embodiment matches the X-axis direction in a plan view from the first winding axis AX1 direction (Z-axis direction) of the first system coil antenna 101. In contrast, a second winding axis AX2 of a second system coil antenna 201 included in the antenna device 305 of the present preferred embodiment is preferably slanted relative to the X-axis and the Y-axis in a plan view from the first winding axis direction (Z-axis direction) of the first system coil antenna 101.

In the example illustrated in FIG. 8, the second winding axis AX2 of the second system coil antenna 201 intersects with the sides 11L and 11R of the first coil conductor 11 non-perpendicularly in a plan view from the first winding axis direction (Z-axis direction). Other elements are the same or substantially the same as those described in the first preferred embodiment.

According to the present preferred embodiment, each of the sides of the first coil conductor 11 and each of the sides of the second coil conductor 21 are not parallel or substantially parallel to each other and do not oppose each other in close proximity to each other, such that unwanted electric field coupling, magnetic field coupling, and other coupling between the first coil conductor 11 and the second coil conductor 21 are small in strength.

Sixth Preferred Embodiment

In a sixth preferred embodiment of the present invention, an example in which a configuration of a second system coil antenna is different from that of the second system coil antenna of the first preferred embodiment will be described.

Figure 9A:
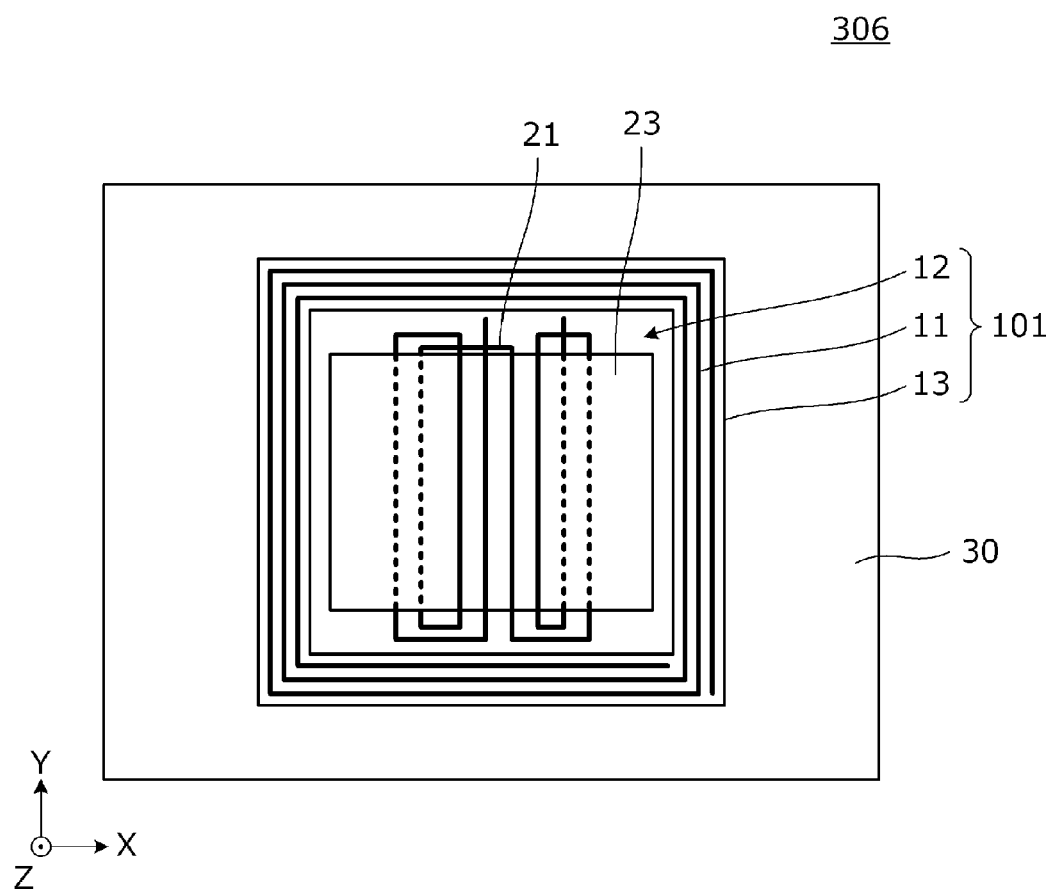
FIG. 9A is a plan view of a main portion of an antenna device 306 according to a sixth preferred embodiment of the present invention.
Figure 9B:
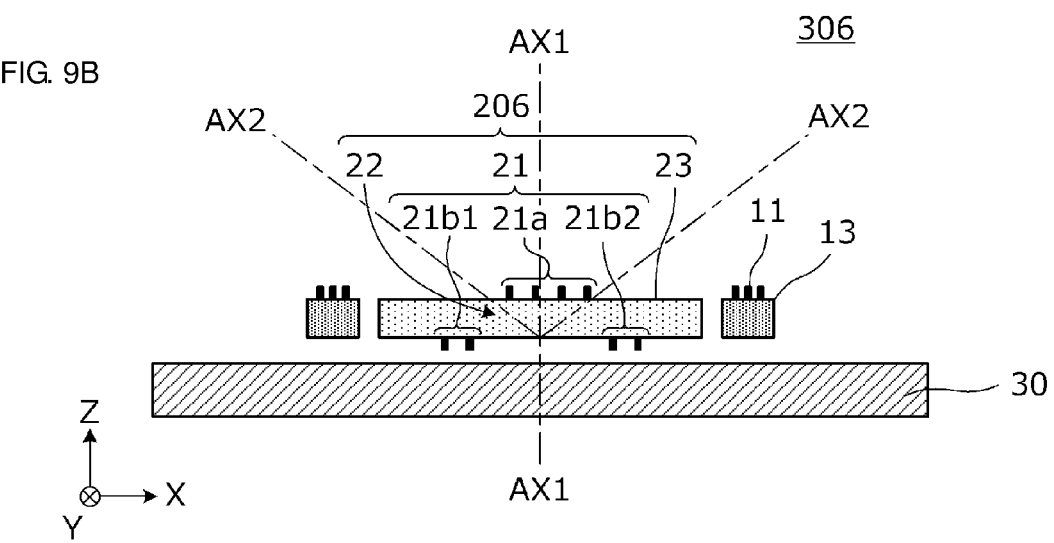
FIG. 9B is a longitudinal cross-sectional view passing through the center thereof.

FIG. 9A is a plan view of a main portion of an antenna device 306 according to the sixth preferred embodiment, and FIG. 9B is a longitudinal cross-sectional view passing through the center or approximate center thereof. The antenna device 306 includes a first system coil antenna 101 and a second system coil antenna 206. The first system coil antenna 101 includes a first coil conductor 11, a first coil opening 12 surrounded by the first coil conductor 11, and a first magnetic body 13. The first system coil antenna 101 is preferably the same or substantially the same as that described in the first preferred embodiment.

The second system coil antenna 206 includes a second coil conductor 21, a second coil opening 22 surrounded by the second coil conductor 21, and a second magnetic body 23. A first conductor section 21a of the second coil conductor 21 and second conductor sections 21b1, 21b2 thereof are positioned on opposed sides of a second winding axis AX2. Further, the second conductor sections 21b1 and 21b2 are isolated from each other with the first conductor section 21a interposed therebetween in a plan view. An axis direction around which the first conductor section 21a and the second conductor section 21b1 of the second coil conductor 21 are wound is different from an axis direction around which the first conductor section 21a and the second conductor section 21b2 of the second coil conductor 21 are wound. As such, the second winding axis AX2 is bent.

Figure 10A:
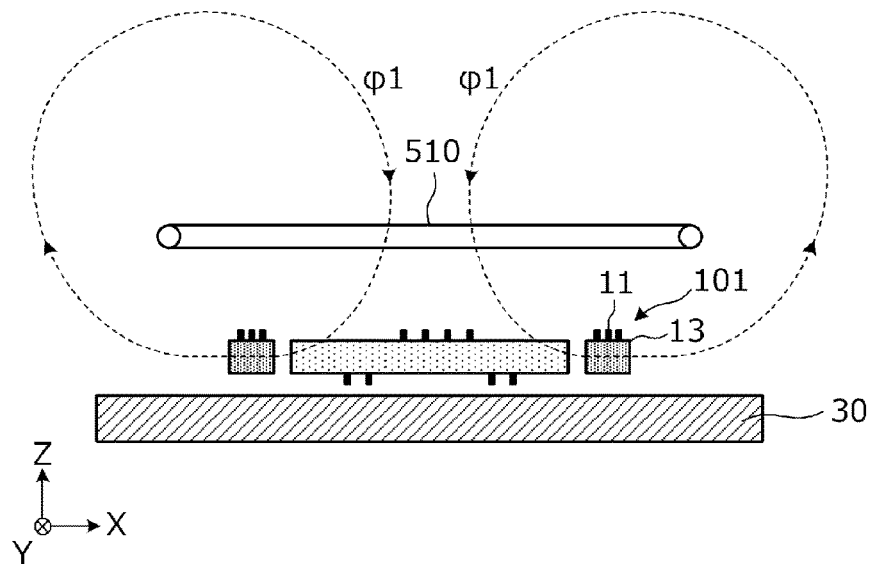
FIG. 10A is a diagram illustrating a coupling state of a first system with a partner-side coil antenna.
Figure 10B:
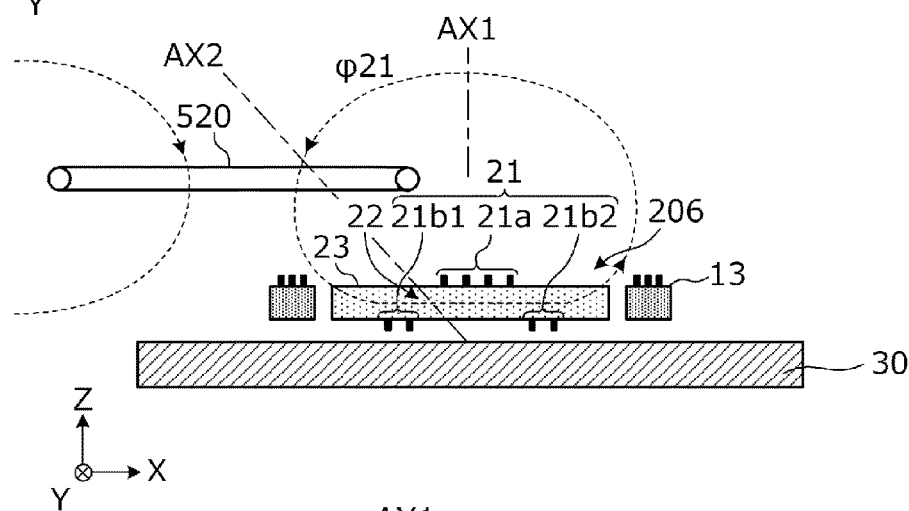
FIG. 10B is a diagram illustrating a coupling state of a second system with the partner-side coil antenna.

FIG. 10A is a diagram illustrating a coupling state of the first system with a partner-side coil antenna, and FIG. 10B is a diagram illustrating a coupling state of the second system with a partner-side coil antenna.

As illustrated in FIG. 10A, a partner-side first system coil antenna 510 is parallel or substantially in parallel to the first coil conductor 11 of the first system coil conductor 101, and is disposed on a side thereof farther from a sheet-shaped conductor 30. As illustrated in FIG. 10A, magnetic flux φ1 generated by the partner-side first system coil antenna 510 establishes interlinkage with the first coil conductor 11 of the first system coil antenna 101. Accordingly, the first system coil antenna 101 and the partner-side first system coil antenna 510 are magnetically coupled.

As illustrated in FIG. 10B, a partner-side second system coil antenna 520 is disposed at a position such that magnetic flux φ21 generated by the partner-side second system coil antenna 520 passes through the second coil opening 22 of the second coil conductor 21 of the second system coil antenna 206. More specifically, the partner-side second system coil antenna 520 is disposed at a position shifted from the center or approximate center of the second system coil antenna 206 towards the second conductor section 21b1 side of the second coil conductor 21 in a plan view from the first winding axis AX1 direction. Accordingly, the second system coil antenna 206 and the partner-side second system coil antenna 520 are magnetically coupled.

Figure 10C:
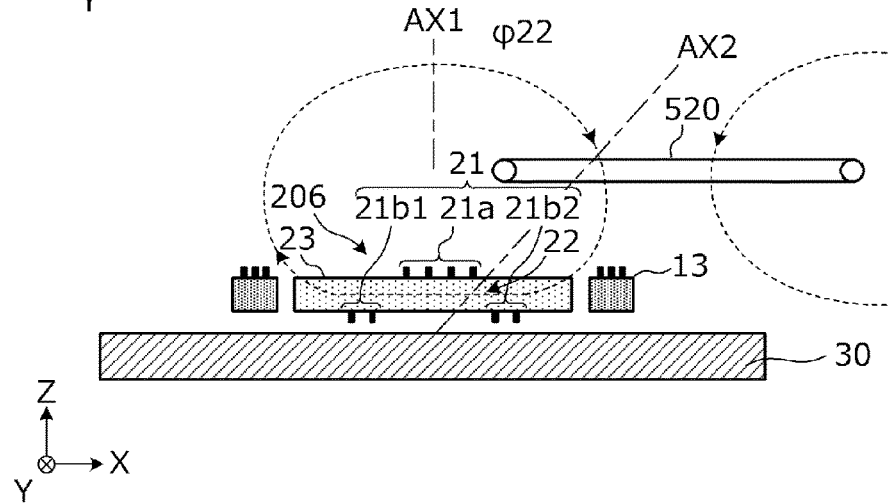
FIG. 10C is also a diagram illustrating another coupling state of the second system with the partner-side coil antenna.

Further, as illustrated in FIG. 10C, the partner-side second system coil antenna 520 is disposed at a position such that magnetic flux φ22 generated by the partner-side second system coil antenna 520 passes through the second coil opening 22 of the second coil conductor 21 of the second system coil antenna 206. More specifically, the partner-side second system coil antenna 520 is disposed at a position shifted from the center or approximate center of the second system coil antenna 206 towards the second conductor section 21b2 side of the second coil conductor 21 in a plan view from the first winding axis AX1 direction. Accordingly, the second system coil antenna 206 and the partner-side second system coil antenna 520 are magnetically coupled.

According to the present preferred embodiment, the second winding axis AX2 is bent to include a plurality of coupling positions with the partner-side second system coil antenna 520, such that the degree of freedom in relative arrangement of the partner-side second system coil antenna 520 is improved.

Seventh Preferred Embodiment

In a seventh preferred embodiment of the present invention, an antenna device having a formation structure of a first coil conductor and a second coil conductor will be described.

Figure 11A:
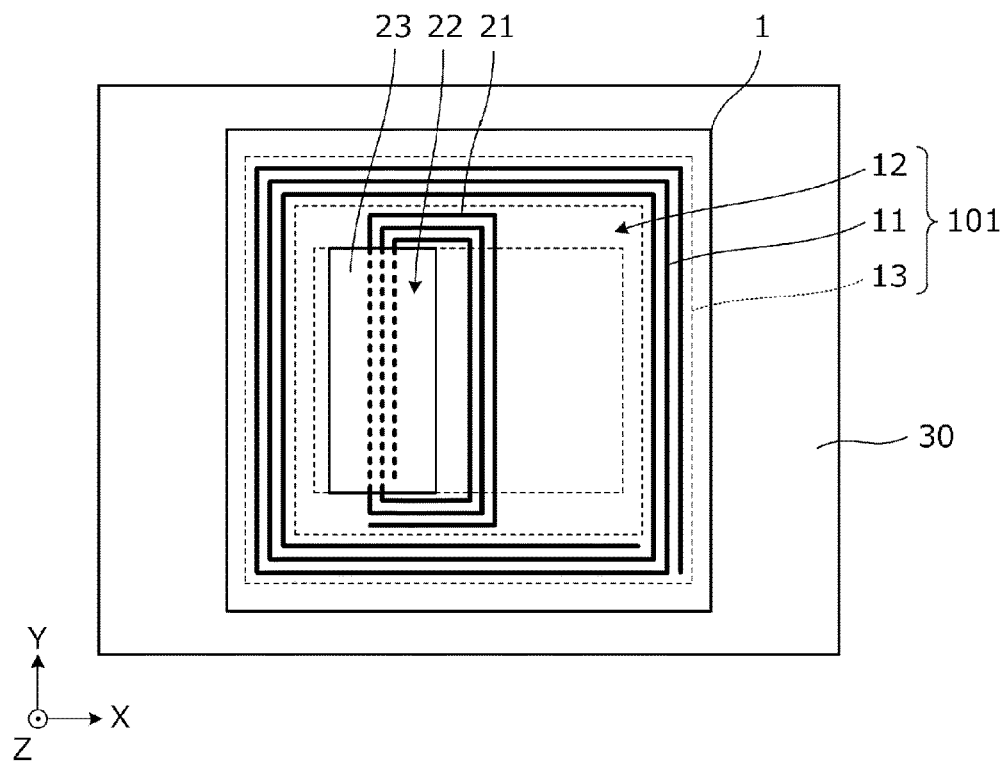
FIG. 11A is a plan view of a main portion of an antenna device 307 according to a seventh preferred embodiment of the present invention.
Figure 11B:
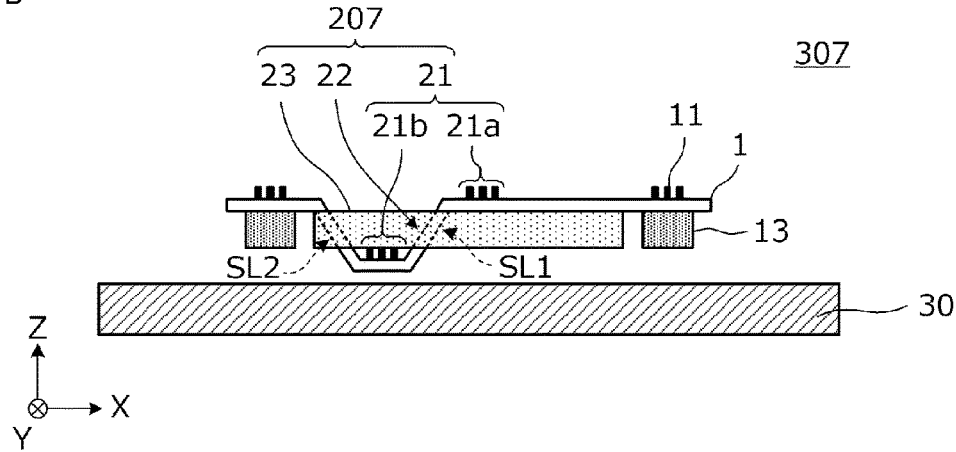
FIG. 11B is a longitudinal cross-sectional view passing through the center thereof.

FIG. 11A is a plan view of a main portion of an antenna device 307 according to the seventh preferred embodiment, and FIG. 11B is a longitudinal cross-sectional view passing through the center or approximate center thereof.

A first coil conductor 11 and a second coil conductor 21 are provided on a single flexible board 1 that is preferably insulative and flexible. The flexible board 1 is an example of an "insulation base material". The flexible board 1 includes slits SL1 and SL2 through which a second magnetic body 23 passes. The slits SL1 and SL2 are an example of a "hole through which a second magnetic body passes".

Structures of the first coil conductor 11, the second coil conductor 21, a first magnetic body 13, and the second magnetic body 23 are preferably the same or substantially the same as those described in the first preferred embodiment.

According to the present preferred embodiment, since coil antennas of the first system and the second system are disposed on the single flexible board 1, the first coil conductor 11 and the second coil conductor 21 are easily provided. In addition, since the number of components is reduced, the manufacturing is performed with ease as well.

The configuration using a flexible board in which coil conductors are provided as described in the present preferred embodiment may be similarly applied to the aforementioned preferred embodiments and preferred embodiments to be explained below.

The first magnetic body 13, the second magnetic body 23, and other elements may preferably be flexible. The first magnetic body 13, the second magnetic body 23, and other elements may be flexible through the following process, for example: a hybrid of magnetic body powder, such as ferrite powder and resin material, is formed in a sheet shape, and the sheet-shaped hybrid is cut into a plurality of small pieces and sintered to form a sintered magnetic body, and then both surfaces of the plurality of small pieces are laminated with a film. The flexible magnetic body may be similarly applied to the aforementioned preferred embodiments and preferred embodiments to be explained below.

Eighth Preferred Embodiment

In an eighth preferred embodiment of the present invention, an example of an antenna device including a magnetic body in which a first magnetic body and a second magnetic body are defined by portions of the magnetic body will be described.

Figure 12A:
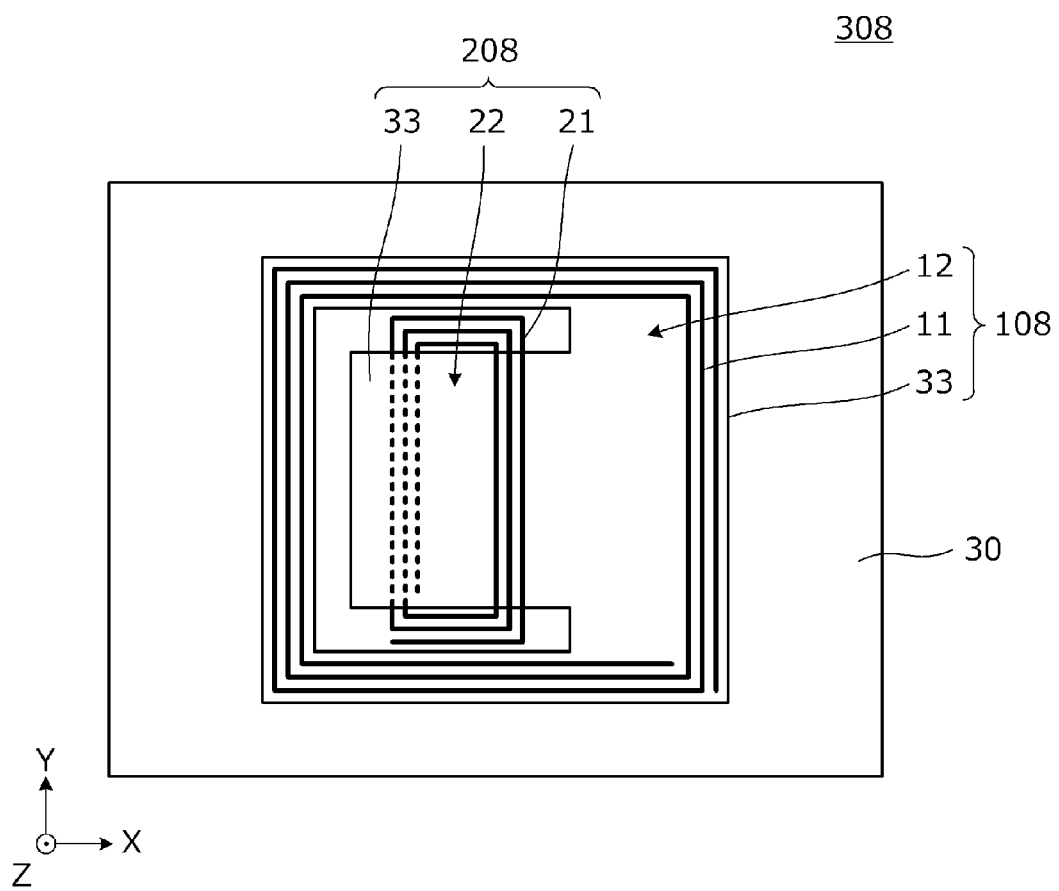
FIG. 12A is a plan view of a main portion of an antenna device 308 according to an eighth preferred embodiment of the present invention.
Figure 12B:
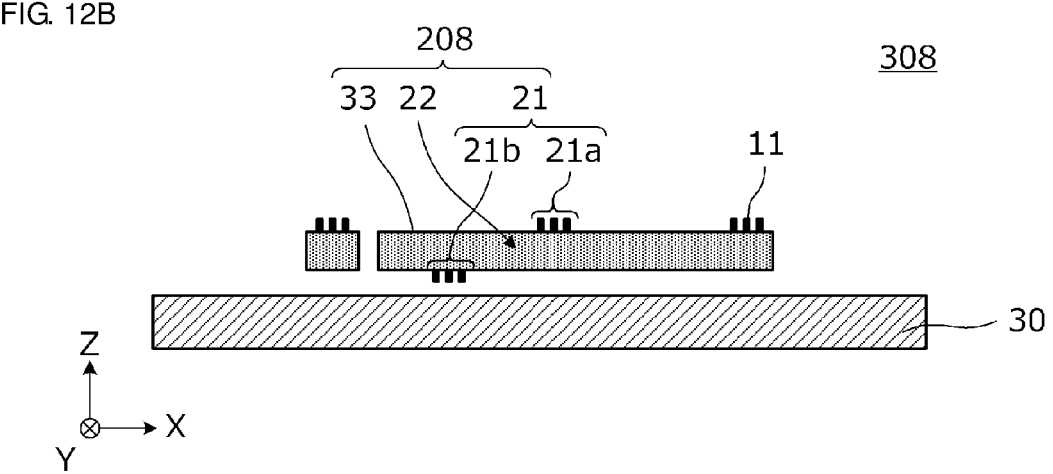
FIG. 12B is a longitudinal cross-sectional view passing through the center thereof.

FIG. 12A is a plan view of a main portion of an antenna device 308 according to the eighth preferred embodiment, and FIG. 12B is a longitudinal cross-sectional view passing through the center or approximate center thereof. The antenna device 308 includes a first system coil antenna 108 and a second system coil antenna 208. The first system coil antenna 108 includes a first coil conductor 11, a first coil opening 12 surrounded by the first coil conductor 11, and a portion of a magnetic body 33. The second system coil antenna 208 includes a second coil conductor 21, a second coil opening 22 surrounded by the second coil conductor 21, and a portion of the magnetic body 33.

The magnetic body 33 has a structure in which the first magnetic body and the second magnetic body are portions of the magnetic body 33. Structures of the first coil conductor 11 and the second coil conductor 21 are preferably the same or substantially the same as those described in the first preferred embodiment.

According to the present preferred embodiment, since positional relationships between the first coil conductor 11 and the second coil conductor 21 are determined with respect to the single magnetic body 33, a relative positional relationship between the first coil conductor 11 and the second coil conductor 21 is highly precise. In addition, the number of magnetic components is decreased to obtain reduction in cost. Further, the structure of the magnetic body 33 is such that the first magnetic body and the second magnetic body are defined by portions thereof, and directivity of each of the first system coil antenna 108 and the second system coil antenna 208 is changed in accordance with the structure of the different portions. As such, the directivity of each of the first system coil antenna 108 and the second system coil antenna 208 is determined by positions of the portions of the first magnetic body and the second magnetic body.

Ninth Preferred Embodiment

In a ninth preferred embodiment of the present invention, an antenna device having a circuit connection structure with respect to first and second system coil antennas will be described.

Figure 13A:
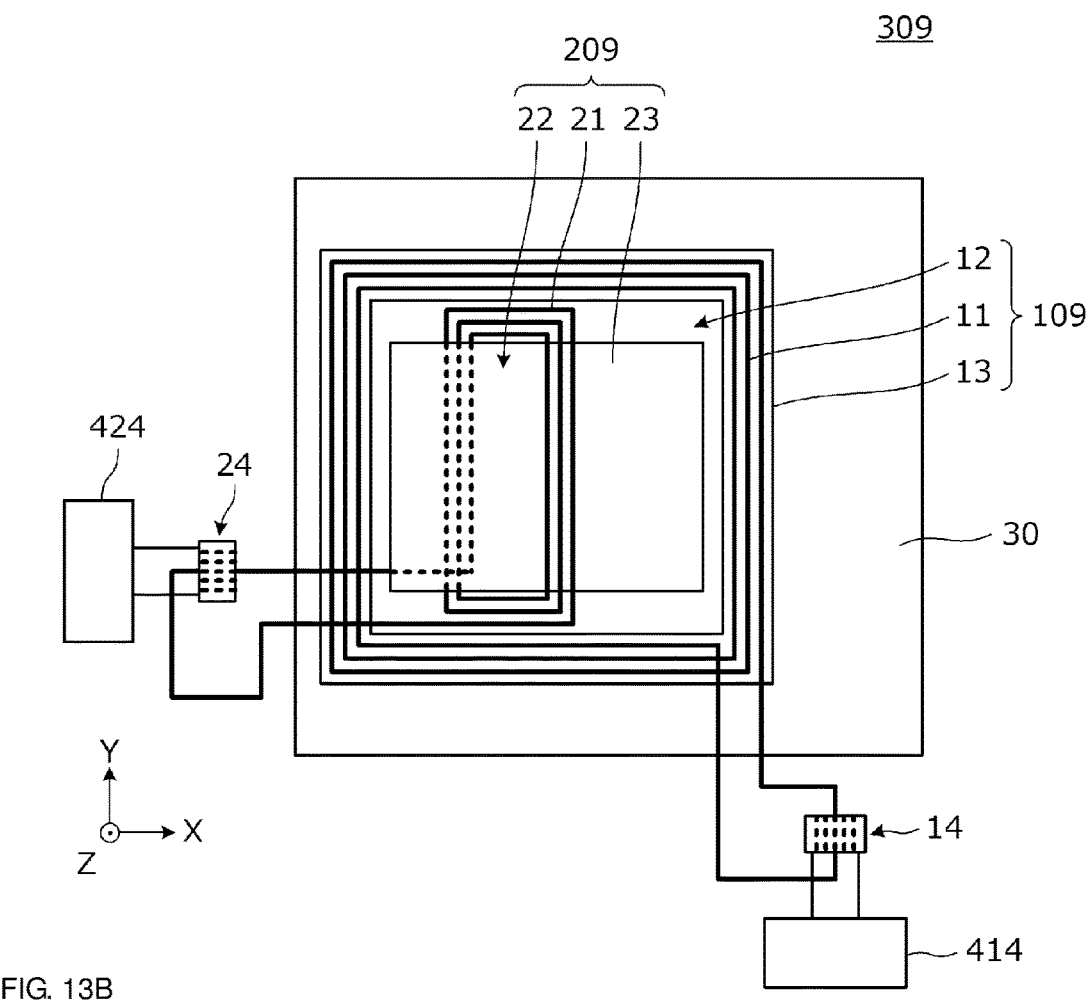
FIG. 13A is a plan view of a main portion of an antenna device 309 according to a ninth preferred embodiment of the present invention.
Figure 13B:
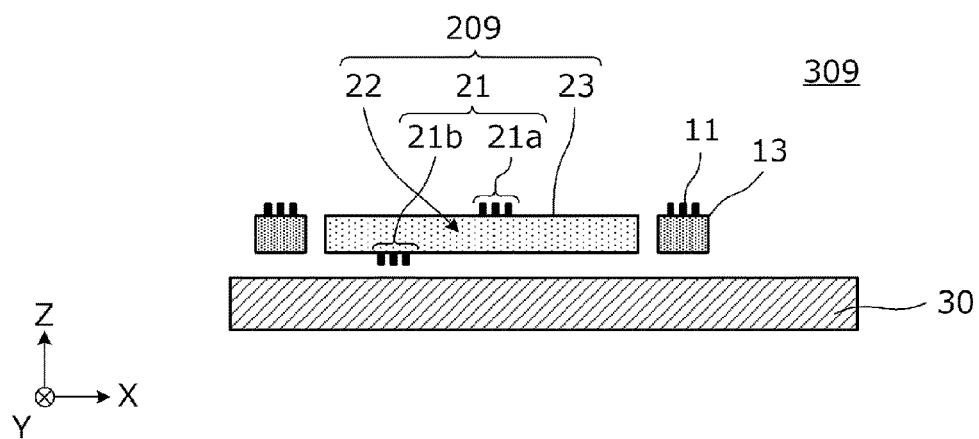
FIG. 13B is a longitudinal cross-sectional view passing through the center thereof.

FIG. 13A is a plan view of a main portion of an antenna device 309 according to the ninth preferred embodiment, and FIG. 13B is a longitudinal cross-sectional view passing through the center or approximate center thereof. The antenna device 309 includes a first system coil antenna 109 and a second system coil antenna 209. The configuration of a basic portion of the first system coil antenna 109 is preferably the same or substantially the same as that of the first system coil antenna 101 described in the first preferred embodiment, and the configuration of a basic portion of the second system coil antenna 209 is preferably the same or substantially the same as that of the second system coil antenna 201 described in the first preferred embodiment.

The antenna device 309 of the present preferred embodiment includes a first system coil 14 magnetically coupled to a portion of a first coil conductor 11, and a second system coil 24 magnetically coupled to a portion of a second coil conductor 21. A first system circuit 414 is connected to the first system coil 14, and a second system circuit 424 is connected to the second system coil 24.

According to the present preferred embodiment, the first system circuit 414 is not directly connected to the first coil conductor 11, but is connected thereto with the first system coil 14 interposed therebetween. As such, a filtering effect is generated due to the indirect connection by the magnetic field coupling of the first system coil 14, and thus, it is further reduced or prevented that a signal or power, for example, originally aimed for the second system, is unnecessarily input to the first system circuit 414. Similarly, the second system circuit 424 is not directly connected to the second coil conductor 21, but is connected thereto with the second system coil 24 interposed therebetween. As such, it is further reduced or prevented that a signal or power, for example, originally aimed for the first system, are unnecessarily input to the second system circuit 424. Further, it is unnecessary for spring pins to be in contact with the first coil conductor 11 and the second coil conductor 21, for example, so as to establish electrical connection. Because of this configuration, it is unnecessary to perform plating on electrodes of the electrical connection portions. In addition, the connection reliability is high because no electrical connection by contact is provided. Moreover, the electrical connection is able to be established regardless of a state of equilibrium/non-equilibrium of the first coil conductor 11 and the second coil conductor 21 and regardless of a state of equilibrium/non-equilibrium of the first system circuit 414 and the second system circuit 424.

Although, in an example illustrated in FIGS. 13A and 13B, the first and second system circuits are connected via the first and second system coils in both of the first and second systems, only the circuit of one of the first and second systems may be connected via the corresponding system coil.

The first system coil 14, the second system coil 24, and other elements may be an open magnetic circuit, so that the first system coil 14, the second system coil 24, and other elements may each define and function as an antenna.

The first system coil 14 may be provided on an insulative base material and may have a transformer structure including a coil-shaped primary coupling conductor to be connected to the first system circuit 414 and a coil-shaped secondary coupling conductor to be connected to the first coil conductor 11 by magnetic field coupling with the primary coupling conductor. Although none of the primary coupling conductor and the secondary coupling conductor are absolutely necessary to be coil-shaped, having a coil-shaped structure strengthens the coupling between the primary coupling conductor and the secondary coupling conductor. The second system coil 24 may also have a transformer structure.

Tenth Preferred Embodiment

In a tenth preferred embodiment of the present invention, an example in which a configuration of a second system coil antenna is different from that of the second system coil antenna of the first preferred embodiment will be described.

Figure 14A:
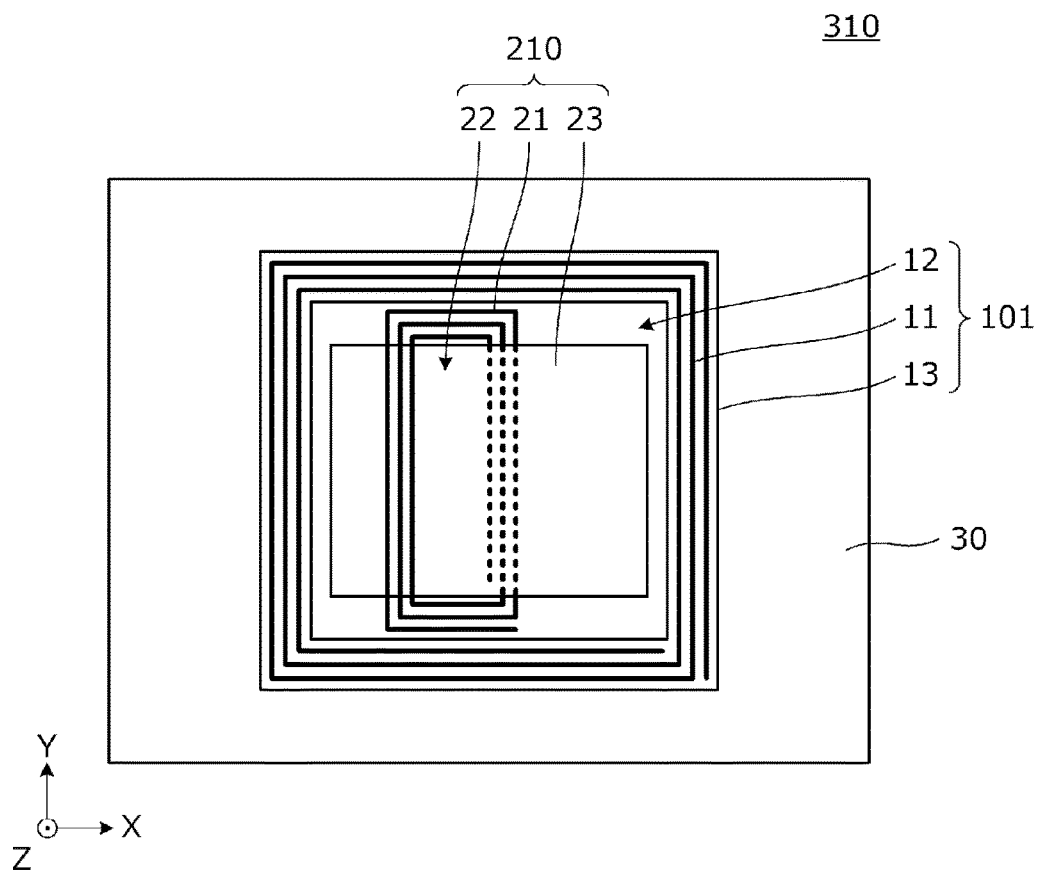
FIG. 14A is a plan view of a main portion of an antenna device 310 according to a tenth preferred embodiment of the present invention.
Figure 14B:
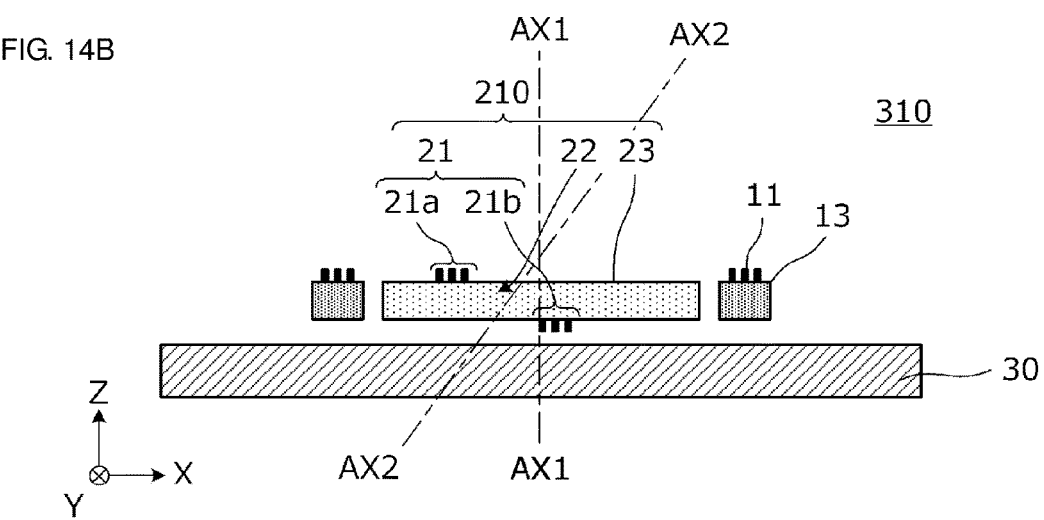
FIG. 14B is a longitudinal cross-sectional view passing through the center thereof.

FIG. 14A is a plan view of a main portion of an antenna device 310 according to the tenth preferred embodiment, and FIG. 14B is a longitudinal cross-sectional view passing through the center or approximate center thereof. The antenna device 310 includes a first system coil antenna 101 and a second system coil antenna 210. The first system coil antenna 101 is preferably the same or substantially the same as that described in the first preferred embodiment, and includes the first coil conductor 11, the first coil opening 12 surrounded by the first coil conductor 11, and the first magnetic body 13. The second system coil antenna 210 includes a second coil conductor 21, a second coil opening 22 surrounded by the second coil conductor 21, and a second magnetic body 23.

A positional relationship between a first conductor section 21a and a second conductor section 21b of the second coil conductor 21 in the present preferred embodiment is different from that of the antenna device 301 in the first preferred embodiment. In the antenna device 310 of the present preferred embodiment, the second conductor section 21b is preferably positioned farther from the first coil conductor 11 than the first conductor section 21a in a plan view from the first winding axis AX1 direction (Z-axis direction).

Although this structure has a disadvantage in terms of an effect of reducing or preventing unwanted coupling because the first conductor section 21a and the first coil conductor 11 are closer to each other, the directivity of the second system coil antenna is able to be changed in comparison with the antenna device 301 described in the first preferred embodiment.

Eleventh Preferred Embodiment

In an eleventh preferred embodiment of the present invention, an example in which a configuration of a second system coil antenna is different from that of the second system coil antenna of the first preferred embodiment will be described.

Figure 15A:
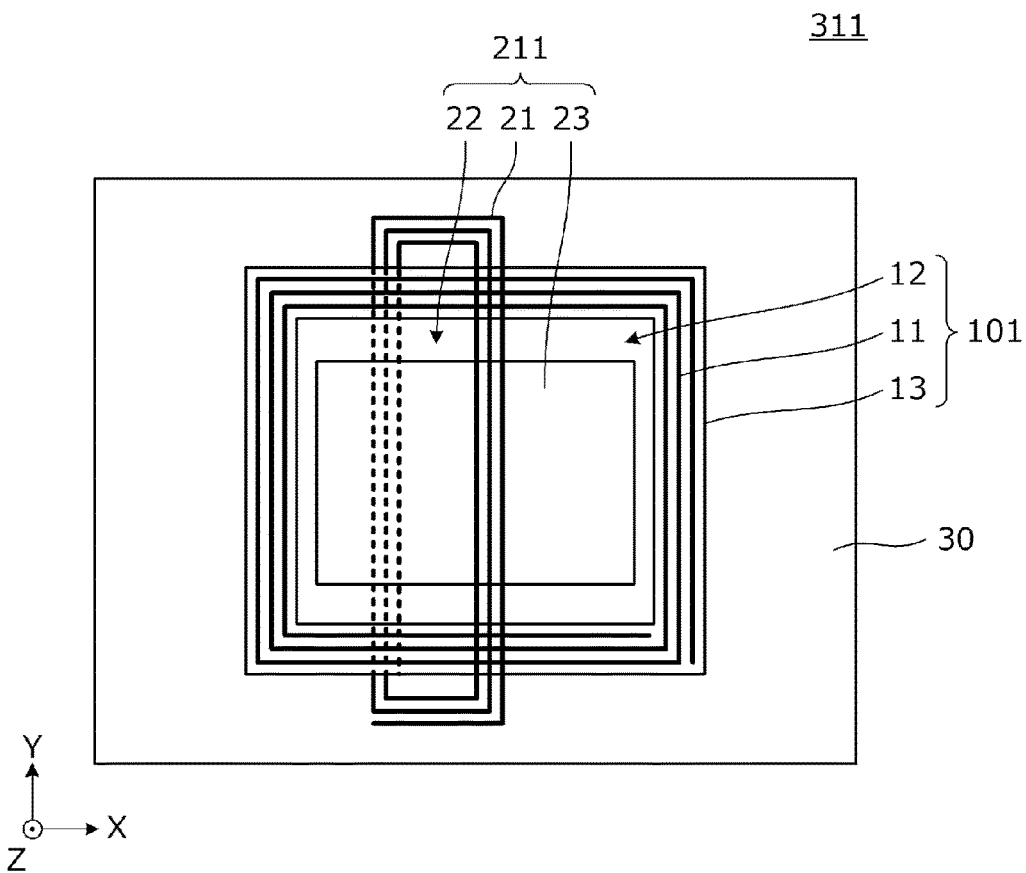
FIG. 15A is a plan view of a main portion of an antenna device 311 according to an eleventh preferred embodiment of the present invention.
Figure 15B:
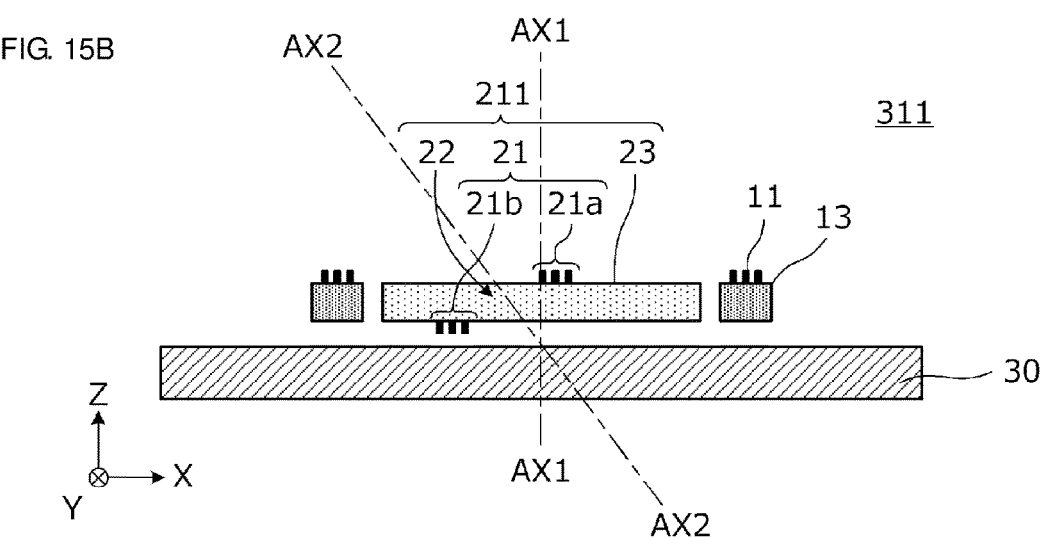
FIG. 15B is a longitudinal cross-sectional view passing through the center thereof.

FIG. 15A is a plan view of a main portion of an antenna device 311 according to the eleventh preferred embodiment, and FIG. 15B is a longitudinal cross-sectional view passing through the center or approximate center thereof. The antenna device 311 includes a first system coil antenna 101 and a second system coil antenna 211. The first system coil antenna 101 is preferably the same or substantially the same as that described in the first preferred embodiment, and includes the first coil conductor 11, the first coil opening 12 surrounded by the first coil conductor 11, and the first magnetic body 13. The second system coil antenna 211 includes a second coil conductor 21, a second coil opening 22 surrounded by the second coil conductor 21, and a second magnetic body 23.

The shape of the second coil conductor 21 in the present preferred embodiment is different from that of the antenna device 301 in the first preferred embodiment. That is, a portion of the second coil conductor 21 is positioned outside the formation region of the first coil conductor 11 in a plan view from the first winding axis AX1 direction (Z-axis direction).

Also with this structure, the second coil conductor 21 is positioned within the formation region of the first coil conductor 11 and the first coil opening 12 in the second winding axis AX2 direction when viewed from the first winding axis AX1 direction, such that effects and advantages similar to that described in the first preferred embodiment is obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a first system coil antenna including a first coil conductor wound around a first winding axis and a first coil opening surrounded by the first coil conductor; and
a second system coil antenna including a second coil conductor wound around a second winding axis extending in a second winding axis direction different from a first winding axis direction in which the first winding axis extends, and a second coil opening surrounded by the second coil conductor; wherein
when viewed from the first winding axis direction, the second coil conductor is positioned within a first region including the first coil conductor and the first coil opening;
the second coil conductor includes a first conductor section and a second conductor section on opposed sides of the second winding axis; and
the first conductor section or the second conductor section does not overlap with any other portion of the second coil conductor when viewed from the first winding axis direction.

2. The antenna device according to claim 1, wherein, when viewed from the first winding axis direction, an entirety of the second coil conductor is positioned within the first region including the first coil conductor and the first coil opening.

3. The antenna device according to claim 2, wherein the second coil conductor is positioned inside the first coil opening when viewed from the first winding axis direction.

4. The antenna device according to claim 1, wherein the first conductor section is closer to the first coil conductor than the second conductor section in the first winding axis direction when viewed from a direction perpendicular or substantially perpendicular to the first winding axis direction, and the first conductor section is positioned farther from the first coil conductor than the second conductor section when viewed from the first winding axis direction.

5. The antenna device according to claim 4, wherein a line width of the first conductor section is larger than a line width of the second conductor section.

6. The antenna device according to claim 4, further comprising:
a first magnetic body that overlaps with the first coil conductor in a view from the first winding axis direction, and is positioned on the second conductor section side in the first winding axis direction in a view from the direction perpendicular or substantially perpendicular to the first winding axis direction.

7. The antenna device according to claim 4, further comprising:
a second magnetic body that overlaps with the first conductor section and the second conductor section in a view from the first winding axis direction, and is positioned between the first conductor section and the second conductor section in a view from the direction perpendicular or substantially perpendicular to the first winding axis direction.

8. The antenna device according to claim 4, further comprising:
a first magnetic body that overlaps with the first coil conductor in a view from the first winding axis direction, and is positioned on the second conductor section side in the first winding axis direction in a view from the direction perpendicular or substantially perpendicular to the first winding axis direction; and
a second magnetic body that overlaps with the first conductor section and the second conductor section in a view from the first winding axis direction, and is positioned between the first conductor section and the second conductor section in a view from the direction perpendicular or substantially perpendicular to the first winding axis direction; wherein
the first magnetic body and the second magnetic body are electrically isolated from each other.

9. The antenna device according to claim 4, further comprising:
a first magnetic body that overlaps with the first coil conductor in a view from the first winding axis direction, and is positioned on the second conductor section side in the first winding axis direction in a view from the direction perpendicular or substantially perpendicular to the first winding axis direction; and
a second magnetic body that overlaps with the first conductor section and the second conductor section in a view from the first winding axis direction, and is positioned between the first conductor section and the second conductor section in a view from the direction perpendicular or substantially perpendicular to the first winding axis direction; wherein
the first magnetic body and the second magnetic body are defined by a single magnetic body.

10. The antenna device according to claim 7, further comprising:
an insulation base material including a hole through which the second magnetic body passes.

11. The antenna device according to claim 1, further comprising:
a first system coil that is connected to a first system circuit and connects the first system circuit and the first system coil antenna by magnetic field coupling.

12. The antenna device according to claim 1, further comprising:
a second system coil that is connected to a second system circuit and connects the second system circuit and the second system coil antenna by magnetic field coupling.

13. The antenna device according to claim 1, wherein the first system and the second system use a frequency band in an HF band or a frequency band lower than the HF band.

14. The antenna device according to claim 1, wherein one of the first system and the second system is a power transmission system, and another one of the first system and the second system is a communication system.

15. The antenna device according to claim 14, wherein the power transmission system is a magnetic-field resonance power transmission system.

16. The antenna device according to claim 14, wherein the communication system is a short-range radio communication system.

17. An electronic apparatus comprising:
an antenna device; and
a first system circuit and a second system circuit that are connected to the antenna device; wherein
the antenna device includes:
a first system coil antenna including a first coil conductor wound around a first winding axis and a first coil opening surrounded by the first coil conductor; and
a second system coil antenna including a second coil conductor wound around a second winding axis extending in a second winding axis direction different from a first winding axis direction in which the first winding axis extends, and a second coil opening surrounded by the second coil conductor;

when viewed from the first winding axis direction, the second coil conductor is positioned within a first region including the first coil conductor and the first coil opening;

the second coil conductor includes a first conductor section and a second conductor section on opposed sides of the second winding axis; and the first conductor section or the second conductor section does not overlap with any other portion of the second coil conductor when viewed from the first winding axis direction.

18. The electronic apparatus according to claim 17, wherein, when viewed from the first winding axis direction, an entirety of the second coil conductor is positioned within the first region including the first coil conductor and the first coil opening.

19. The electronic apparatus according to claim 18, wherein the second coil conductor is positioned inside the first coil opening when viewed from the first winding axis direction.

20. The electronic apparatus according to claim 17, wherein
the first conductor section is closer to the first coil conductor than the second conductor section in the first winding axis direction when viewed from a direction perpendicular or substantially perpendicular to the first winding axis direction, and the first conductor section is positioned farther from the first coil conductor than the second conductor section when viewed from the first winding axis direction.

\* \* \* \* \*